United States Patent
Ryu et al.

(10) Patent No.: US 11,044,677 B2
(45) Date of Patent: Jun. 22, 2021

(54) METHOD AND DEVICE FOR CONTROLLING TRANSMISSION POWER OF TERMINAL IN WIRELESS COMMUNICATION SYSTEM

(71) Applicant: Samsung Electronics Co., Ltd., Suwon-si (KR)

(72) Inventors: Hyunseok Ryu, Yongin-si (KR); Peng Xue, Suwon-si (KR); Hyunkyu Yu, Suwon-si (KR); Sangwon Choi, Seoul (KR); Kuyeon Whang, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/609,600

(22) PCT Filed: May 2, 2018

(86) PCT No.: PCT/KR2018/005096
§ 371 (c)(1),
(2) Date: Oct. 30, 2019

(87) PCT Pub. No.: WO2018/203662
PCT Pub. Date: Nov. 8, 2018

(65) Prior Publication Data
US 2020/0059871 A1    Feb. 20, 2020

(30) Foreign Application Priority Data

May 4, 2017    (KR) .................. 10-2017-0057033

(51) Int. Cl.
*H04W 52/24*    (2009.01)
*H04W 76/27*    (2018.01)
(Continued)

(52) U.S. Cl.
CPC ......... *H04W 52/242* (2013.01); *H04L 5/0048* (2013.01); *H04W 52/245* (2013.01); *H04W 72/042* (2013.01); *H04W 76/27* (2018.02)

(58) Field of Classification Search
CPC ........ H04L 5/00; H04W 72/04; H04W 76/27; H04W 76/28; H04W 52/0235
See application file for complete search history.

(56) References Cited

U.S. PATENT DOCUMENTS

2006/0182067 A1* 8/2006 Rinne .................. H04W 16/02
                                                                370/335
2014/0141830 A1    5/2014 Skov et al.
(Continued)

FOREIGN PATENT DOCUMENTS

| JP | 2013-243484 A | 12/2013 |
| WO | 2012/167425 A1 | 12/2012 |
| WO | 2013/048176 A1 | 4/2013 |

OTHER PUBLICATIONS

Extended European Search Report dated Mar. 13, 2020, issued in European Patent Application No. 18793760.2.

*Primary Examiner* — Anez C Ebrahim
(74) *Attorney, Agent, or Firm* — Jefferson IP Law, LLP

(57) ABSTRACT

Disclosed are: a communication technique for merging, with IoT technology, a 5G communication system supporting a data transmission rate higher than a 4G system; and a system therefor. The present disclosure can be applied to intelligent services (for example, smart home, smart building, smart city, smart car or connected car, healthcare, digital education, retail, security and safety related services, and the like) on the basis of 5G communication technology and IoT-related technology. According to one embodiment of the present specification, a communication method of a terminal in a mobile communication system comprises the steps of: receiving, from a base station, first information related to the
(Continued)

number of reference signal resources for path loss identification; receiving, from the base station, downlink control information including second information indicating a reference signal resource to be used for the path loss identification; identifying a path loss on the basis of reference signal received power (RSRP) identified on the basis of the second information; and transmitting an uplink signal to the base station on the basis of the identified path loss.

15 Claims, 13 Drawing Sheets

(51) Int. Cl.
*H04L 5/00* (2006.01)
*H04W 72/04* (2009.01)

(56) References Cited

U.S. PATENT DOCUMENTS

| | | |
|---|---|---|
| 2014/0192673 A1 | 7/2014 | Li et al. |
| 2014/0247796 A1 | 9/2014 | Ouchi et al. |
| 2014/0301342 A1 | 10/2014 | She et al. |
| 2015/0139003 A1 | 5/2015 | Takahashi et al. |
| 2015/0163745 A1* | 6/2015 | Kim .................. H04W 76/28 370/311 |
| 2016/0081101 A1 | 3/2016 | Yu |
| 2017/0064683 A1 | 3/2017 | Seo et al. |
| 2017/0094610 A1 | 3/2017 | Lee et al. |
| 2017/0105180 A1 | 4/2017 | Ma et al. |

\* cited by examiner

METHOD AND DEVICE FOR CONTROLLING TRANSMISSION POWER OF TERMINAL IN WIRELESS COMMUNICATION SYSTEM

TECHNICAL FIELD

The disclosure relates to a power control method for a terminal in a wireless communication system and, more particularly, to a method and apparatus for supporting transmission power control of an uplink control channel in a dynamic frame structure.

BACKGROUND ART

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system".

To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the Internet is evolving from a human centered network where humans create and consume information into the Internet of Things (IoT) where distributed elements or things process and exchange information. There has also emerged the Internet of Everything (IoE) technology that combines IoT technology with big data processing technology through connection with cloud servers. To realize IoT services, base technologies related to sensing, wired/wireless communication and network infrastructure, service interfacing, and security are needed, and technologies interconnecting things such as sensor networks, machine-to-machine (M2M) or machine type communication (MTC) are under development. In IoT environments, it is possible to provide intelligent Internet technology services, which collect and analyze data created by interconnected things to add new values to human life. Through convergence and combination between existing information technologies and various field technologies, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine or machine type communication are being realized by use of 5G communication technologies including beamforming, MIMO, and array antennas. Application of cloud RANs to big data processing described above may be an instance of convergence of 5G communication technology and IoT technology.

Such a 5G communication system requires a lower latency compared with the existing system, and accordingly, there is a need for a method for the terminal to perform transmission power control to satisfy the corresponding requirement.

DISCLOSURE OF INVENTION

Technical Problem

In order to solve the above-described problem, an embodiment of the disclosure is to provide a method and apparatus for enabling a terminal and a base station to perform transmission power control for the uplink control channel in a dynamic frame structure.

Another embodiment of the disclosure is to provide a method and apparatus for enabling a terminal and a base station to perform transmission power control for the uplink control channel in a system using hybrid beamforming, different subcarrier spacings, or different uplink waveforms.

Solution to Problem

According to an embodiment of the disclosure, there is provided a method for communication of a terminal in a mobile communication system. The method may include: receiving first information related to the number of reference signal resources for pathloss identification from a base station; receiving downlink control information including second information indicating a reference signal resource to be used for pathloss identification from the base station; identifying the pathloss based on a reference signal received power (RSRP) obtained according to the second information; and transmitting an uplink signal to the base station based on the identified pathloss.

According to another embodiment of the disclosure, there is provided a method for communication of a base station in a mobile communication system. The method may include: transmitting first information related to the number of reference signal resources for pathloss identification to a terminal; transmitting downlink control information including second information indicating a reference signal resource to be used for pathloss identification to the terminal; and receiving an uplink signal from the terminal on the basis of the pathloss identified based on a reference signal received power (RSRP) obtained according to the second information.

According to another embodiment of the disclosure, there is provided a terminal in a mobile communication system. The terminal may include: a transceiver; and a controller associated with the transceiver, and configured to receive first information related to the number of reference signal resources for pathloss identification from a base station, receive downlink control information including second information indicating a reference signal resource to be used for pathloss identification from the base station, identify the pathloss based on a reference signal received power (RSRP) obtained according to the second information, and transmit an uplink signal to the base station based on the identified pathloss.

According to another embodiment of the disclosure, there is provided a base station in a mobile communication system. The base station may include: a transceiver; and a controller associated with the transceiver, and configured to transmit first information related to the number of reference signal resources for pathloss identification to a terminal, transmit downlink control information including second information indicating a reference signal resource to be used for pathloss identification to the terminal, and receive an uplink signal from the terminal on the basis of the pathloss identified based on a reference signal received power (RSRP) obtained according to the second information.

Advantageous Effects of Invention

According to an embodiment of the disclosure, uplink power control can be efficiently performed in a communication system. In addition, uplink latency can be reduced.

MODE FOR THE INVENTION

Figure 1A:
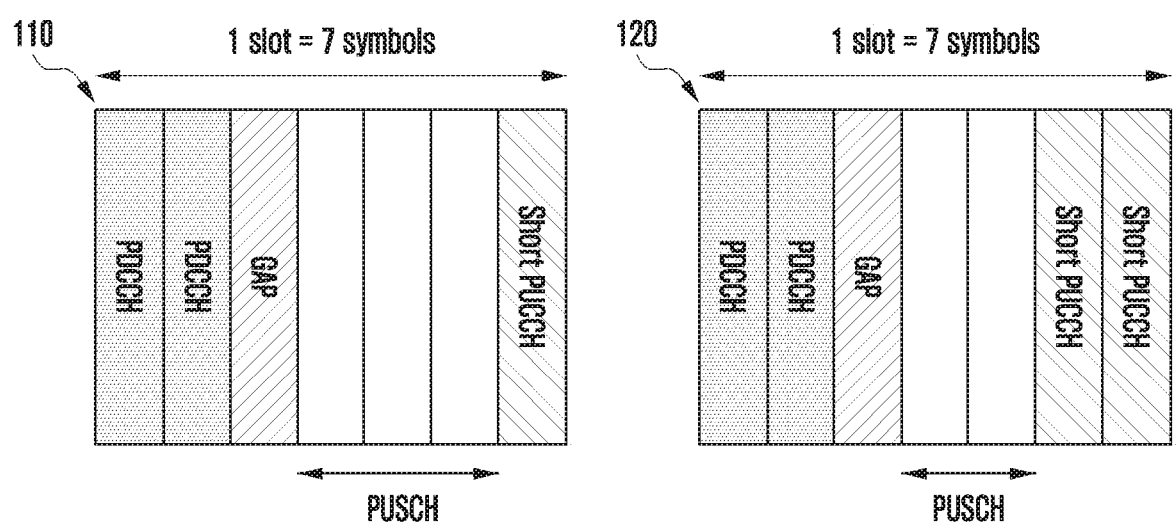
FIG. 1A is an illustration of a dynamic frame structure.

Hereinafter, embodiments of the disclosure are described in detail with reference to the accompanying drawings. Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system".

To achieve higher data rates, 5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Embodiments of the disclosure include a method and apparatus enabling the base station and the terminal to perform transmission power control for the uplink control channel in a system supporting a dynamic frame structure.

In the LTE cellular communication system, transmission power control for an uplink control channel (physical uplink control channel (PUCCH)) can be performed based on Equation 1 below.

$$P_{PUCCH}(i) = \min\{P_{CMAX}(i), P0\_PUCCH + PL + h(nCQI, nHARQ, nSR) + \Delta F\_PUCCH(F) + \Delta TxD(F') + g(i)\}[dBm] \quad \text{Equation 1}$$

In Equation 1, PPUCCH(i) represents the transmission power of the terminal at the i-th subframe for the physical uplink control channel (PUCCH), which is a physical channel for transmitting uplink control information. P0_PUCCH is a parameter given by P0_NOMINAL_PUCCH+P0_UE_PUCCH and is a value that can be set by the base station to the terminal through higher layer signaling (e.g., RRC signaling). P0_NOMINAL_PUCCH is a cell-specific value of 8 bits and is in the range of [−126, 24] dB. P0_UE_PUCCH is a UE-specific value of 4 bits and is in the range of [−8, 7] dB. A cell-specific value may be transmitted by the base station to the terminal through cell-specific RRC signaling (system information block (SIB)), and a UE-specific value may be transmitted by the base station to the terminal through dedicated RRC signaling.

In Equation 1, PL indicates a path loss value calculated by the terminal based on the reception power of a cell-specific reference signal (CRS) transmitted by the base station through a downlink channel. More specifically, the base station transmits referenceSignalPower (CRS transmission power) and a filtering coefficient for averaging reference signal received powers (RSRP) measured by the terminal through UE-specific or cell-specific RRC signaling. Based on this, the terminal calculates the path loss value using Equation 2 below.

$$PL = \text{referenceSignalPower} - \text{higher layer filtered RSRP} \quad \text{Equation 2}$$

In Equation 1, $\Delta F\_PUCCH$ (F) is transmitted to the terminal through higher layer signaling (cell-specific or UE-specific RRC signaling), and its value varies according to the PUCCH format and is given relative to PUCCH format 1a (carrying 1-bit HARQ-ACK/NACK). $\Delta F\_PUCCH$ (F) is given in Table 1.

TABLE 1

$\Delta F\_PUCCH$ (F) Values

| PUCCH Format | Parameters, $\Delta_{F\_PUCCH}$ (F) | Values [dB] |
| --- | --- | --- |
| 1 | deltaF-PUCCH-Format1 | [−2, 0, 2] |
| 1b | deltaF-PUCCH-Format1b | [1, 3, 5] |
| 2 | deltaF-PUCCH-Format2 | [−2, 0, 1, 2] |
| 2a | deltaF-PUCCH-Format2a | [−2, 0, 2] |
| 2b | deltaF-PUCCH-Format2b | [−2, 0, 2] |

In Equation 1, $\Delta TxD$ (F') is a parameter transmitted to the terminal through higher layer signaling (cell-specific or UE-specific RRC signaling) when the PUCCH is transmitted through a 2-antenna port configuration (i.e., space frequency block coding (SFBC)). $\Delta TxD$ (F') varies depending on the PUCCH format as shown in Table 2. $\Delta TxD$ (F')=0 when SFBC is not used.

TABLE 2

$\Delta_{TxD}$ (F') Values

| PUCCH Format | Parameters, $\Delta_{TxD}$ (F') | Values [dB] |
| --- | --- | --- |
| 1 | deltaTxD-OffsetPUCCH-Format1 | [0, −2] |
| 1a/1b | deltaTxD-OffsetPUCCH-Format1a1b | [0, −2] |
| 2/2a/2b | deltaTxD-OffsetPUCCH-Format22a2b | [0, −2] |
| 3 | deltaTxD-OffsetPUCCH-Format3 | [0, −2] |

In Equation 1, $h(n_{CQI}, n_{HARQ}, n_{SR})$ varies according to the PUCCH format, where $n_{CQI}$ is the number of bits used for channel quality information feedback, $n_{HARQ}$ is the number of bits used for HARQ-ACK/NACK feedback, and $n_{SR}$ indicates the number of bits used for scheduling request (SR) feedback and is 0 or 1. More specifically, $h(n_{CQI}, n_{HARQ}, n_{SR})=0$ for PUCCH formats 1, 1a and 1b. In the case of using normal CP in PUCCH formats 2, 2a and 2b, $h(n_{CQI}, n_{HARQ}, n_{SR})$ is given as follows.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases} \quad \text{Equation 3}$$

In the case of using extended CP in PUCCH format 2, $h(n_{CQI}, n_{HARQ}, n_{SR})$ is given as follows.

$$h(n_{CQI}, n_{HARQ}, n_{SR}) = \quad \text{Equation 4}$$
$$\begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$

For PUCCH format 3, $h(n_{CQI}, n_{HARQ}, n_{SR})$ is given as follows.

$$h(n_{CQI}, n_{HARQ}, n_{SR}) = \quad \text{Equation 5}$$
$$\begin{cases} \dfrac{n_{HARQ} + n_{SR} - 1}{3} & \text{if PUCCH transmission on two antenna ports or } n_{HARQ} + n_{SR} \geq 11 \text{ bits} \\ \dfrac{n_{HARQ} + n_{SR} - 1}{2} & \text{otherwise} \end{cases}$$

In Equation 1, g (i) is a parameter for performing closed-loop power control, and is given by Equation 6 below.

$$g(i) = g(i-1) + \Sigma_{m=0}^{M-1} \delta_{PUCCH}(i-k_m) \quad \text{Equation 6}$$

That is, g (i) at the i-th subframe can be determined by summing the g (i−1) value used in the previous subframe (i.e., i−1$^{th}$ subframe) and the value obtained by accumulating $\delta_{PUCCH}$ values transmitted as DCI to the terminal via a downlink control channel (physical downlink control channel (PDCCH)) at the i-k$_m^{th}$ subframe. In the FDD system, M=1, k$_0$=4. In the TDD system, M and k$_0$ may have different values according to the DL/UL configuration as shown in Table 3 below.

TABLE 3

{k$_0$, k$_1$, ..., k$_{M-1}$} for TDD

| TDD DL/UL Configu-ration | Subframe number n | | | | | | | | | |
|---|---|---|---|---|---|---|---|---|---|---|
| | 0 | 1 | 2 | 3 | 4 | 5 | 6 | 7 | 8 | 9 |
| 1 | — | — | 6 | — | 4 | — | — | 6 | — | 4 |
| 2 | — | — | 7, 6 | 4 | — | — | — | 7, 6 | 4 | — |
| 3 | — | — | 8, 7, 4, 6 | — | — | — | — | 8, 7, 4, 6 | — | — |
| 4 | — | — | 7, 6, 11 | 6, 5 | 5, 4 | — | — | — | — | — |
| 5 | — | — | 12, 8, 7, 11 | 6, 5, 4, 7 | — | — | — | — | — | — |
| 6 | — | — | 13, 12, 8, 9, 7, 5, 4, 11, 6 | — | — | — | — | — | — | — |
| 7 | — | — | 7 | 7 | 5 | — | — | 7 | 7 | — |

The value of $\delta_{PUCCH}$ may vary according to the DCI format, and the values in Table 4 are used for DCI format 1A/1B/1D/1/2A/2B/2C/2/3. For DCI format 3A, $\delta_{PUCCH}$ uses the value shown in Table 5.

TABLE 4

Mapping of TPC Command Field in DCI format 1A/1B/1D/1/2A/2B/2C/2/3 to accumulated $\delta_{PUCCH}$ values.

| TPC Command Field in DCI format 1A/1B/1D/1/2A/2B/2C/2/3 | Accumulated $\delta_{PUCCH}$ [dB] |
|---|---|
| 0 | −1 |
| 1 | 0 |
| 2 | 1 |
| 3 | 3 |

TABLE 5

Mapping of TPC Command Field in DCI format 3A to accumulated $\delta_{PUSCH}$ values.

| TPC Command Field in DCI format 3A | Accumulated $\delta_{PUSCH}$ [dB] |
|---|---|
| 0 | −1 |
| 1 | 1 |

The uplink transmission power of the terminal is controlled so as to minimize the amount of interference caused to neighbor cells and to minimize the power consumed by the terminal. In addition, uplink transmission power is controlled to maintain the strength of a signal received by the base station at a constant level regardless of the position of the terminal in the cell, ensuring that the signal transmitted by the terminal is within the dynamic range for the automatic gain control (AGC) of the base station. For such transmission power control, the terminal should be able to set a transmission power value for PUCCH transmission in the digital domain or the analog domain. Also, the transmission power should not exceed the maximum output value of the terminal, $P_{CMAX}(i)$, as illustrated in Equation 1 above.

Meanwhile, in a communication system including LTE, HARQ-ACK/NACK feedback information corresponding to downlink data received by the terminal from the base station at the n$^{th}$ subframe is transmitted through the uplink at the n+4$^{th}$ subframe. Such an operation may not satisfy a low communication latency, which is one of the requirements of the 5G communication system, and may reduce the flexibility of the base station scheduler because it limits the degree of freedom of the base station scheduler. To solve this problem, a frame structure in which HARQ-ACK/NACK feedback information corresponding to downlink data received by the terminal from the base station at the n$^{th}$ subframe can be transmitted at the same subframe (n$^{th}$ subframe) has been proposed. This frame structure can increase the downlink data rate through fast HARQ-ACK/NACK feedback.

A dynamic frame structure has been proposed to maximize the flexibility of the base station operation and to satisfy a low latency requirement, which is one of the requirements for 5G communication systems. In such a dynamic frame structure, the subframe configuration can be changed dynamically every subframe. (For example, the subframe configuration can be variable in such a way of receiving downlink data at the n$^{th}$ subframe, transmitting uplink data at the n+1$^{th}$ subframe, receiving downlink data at the n+2$^{th}$ subframe, and transmitting uplink control information at the n+3$^{th}$ subframe.) In addition, the uplink data channel or the uplink control channel capable of transmitting uplink control information may be dynamically changed every subframe.

FIG. 1A is an illustration of a dynamic frame structure.

With reference to FIG. 1A, one slot 110 or 120 may contain seven symbols. Among the seven symbols, the first two symbols may be used to transmit a downlink control channel (physical downlink control channel (PDCCH)), and short PUCCH (S-PUCCH) transmission for uplink control information including fast HARQ-ACK/NACK feedback transmission may be located at the last one or two symbols. Among the 7 symbols, 4 or 3 symbols other than 2 symbols for the PDCCH and 1 or 2 symbols for the S-PUCCH may be used for the physical uplink shared channel (PUSCH), and the terminal may transmit uplink data through the PUSCH. Here, in order for the terminal to transmit the uplink PUSCH after receiving the downlink PDCCH, a hardware switching time is required. Similarly, in order for the base station to transmit the downlink PDCCH and receive the uplink PUSCH from the terminal, a hardware switching time is required. The use of a 1-symbol gap is illustrated for this hardware switching time. Although two symbols are illustrated as being used for PDCCH transmission in FIG. 1A, one, three, or more symbols may be used for PDCCH transmission. In addition, two or more symbols may be used for the gap. In one embodiment, among the 7 symbols, 4 or 3 symbols other than 2 symbols for the PDCCH and 1 or 2 symbols for the S-PUCCH may be used for the PDSCH.

Figure 1B:
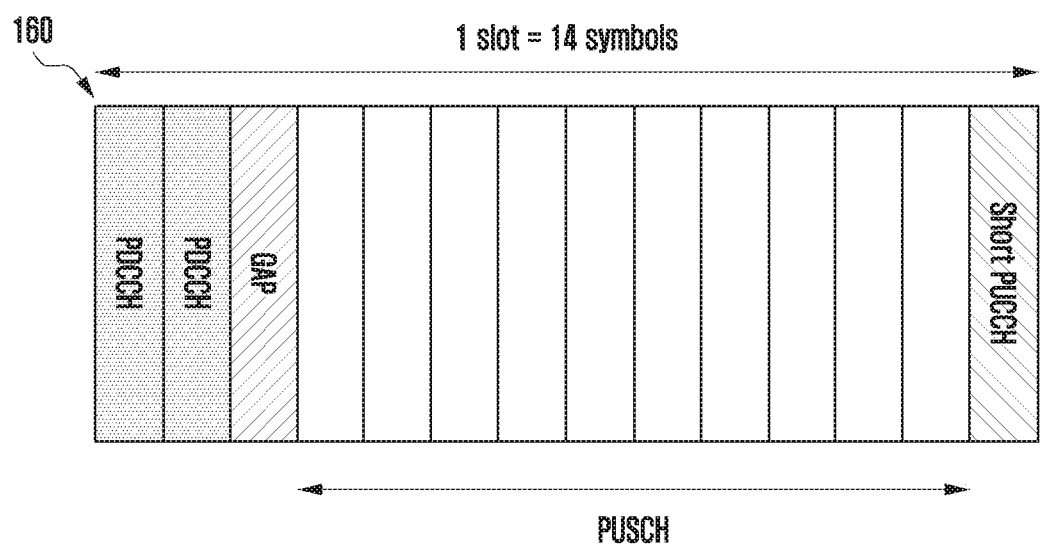
FIG. 1B is another illustration of a dynamic frame structure.
Figure 1B:
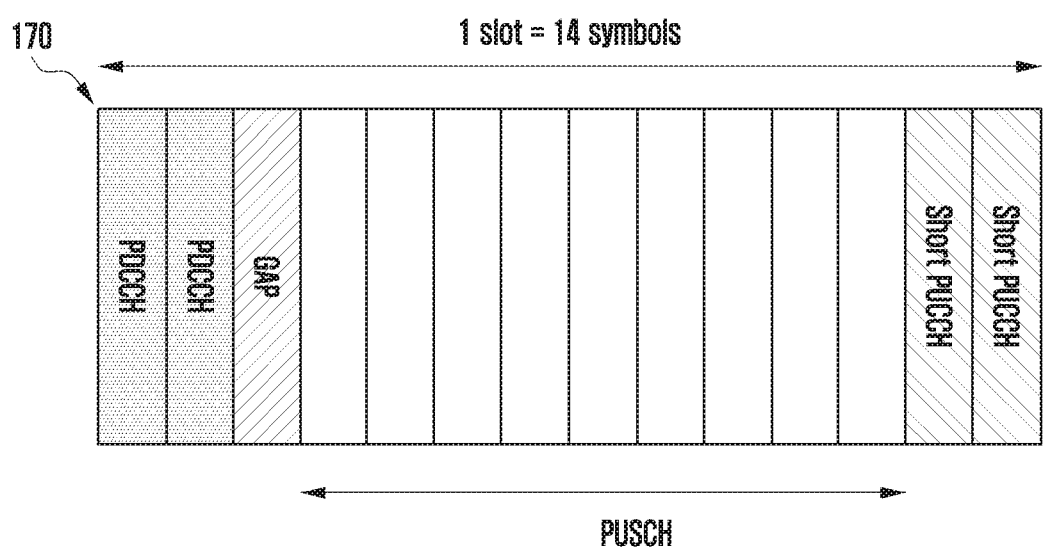

FIG. 1B is another illustration of a dynamic frame structure.

FIG. 1A describes a case where one slot is composed of 7 symbols, but FIG. 1B describes a case where one slot 160 or 170 is composed of 14 symbols. Among the 14 symbols, the first two symbols may be used to transmit a downlink control channel (physical downlink control channel (PDCCH)), and short PUCCH (S-PUCCH) transmission for fast HARQ-ACK/NACK feedback may be located at the last one or two symbols. Among the 14 symbols, 11 or 10 symbols other than 2 symbols for the PDCCH and 1 or 2 symbols for the S-PUCCH may be used for the physical uplink shared channel (PUSCH), and the terminal may transmit uplink data through the PUSCH. Here, in order for the terminal to transmit the uplink PUSCH after receiving the downlink PDCCH, a hardware switching time is required. Similarly, in order for the base station to transmit the downlink PDCCH and receive the uplink PUSCH from the terminal, a hardware switching time is required. The use of a 1-symbol gap is illustrated for this hardware switching time. Although two symbols are illustrated as being used for PDCCH transmission in FIG. 1B, one, three, or more symbols may be used for PDCCH transmission. In addition, two or more symbols may be used for the gap. In one embodiment, among the 14 symbols, 11 or 10 symbols other than 2 symbols for the PDCCH and 1 or 2 symbols for the S-PUCCH may be used for the PDSCH.

Figure 2:
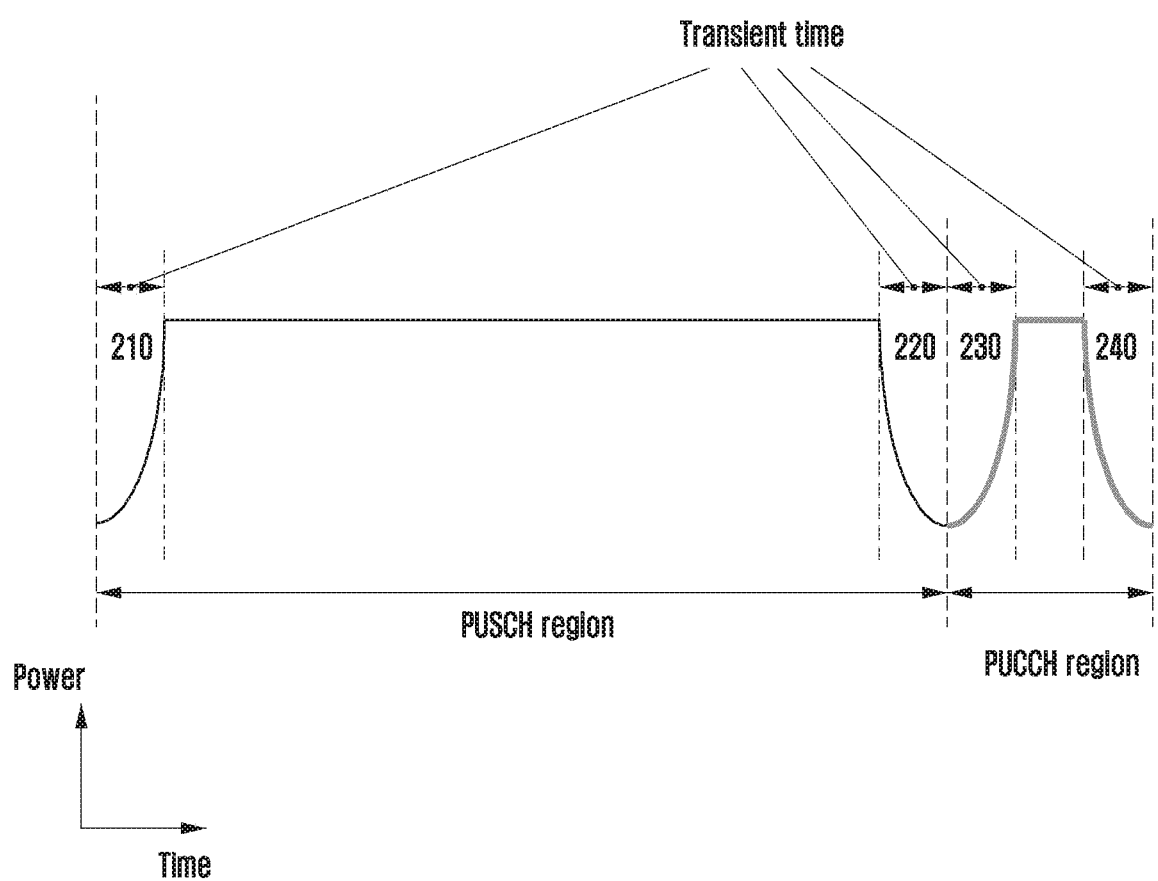
FIG. 2 shows an example of a power transient time generated when the terminal transmits an uplink data channel (PUSCH) and then transmits an uplink control channel (PUCCH) during the same slot in the case of a dynamic frame structure.

FIG. 2 shows an example of a power transient time generated when the terminal transmits the uplink data channel (PUSCH) and then transmits the uplink control channel (PUCCH) during the same slot in the case of using a dynamic frame structure illustrated in FIG. 1A or 1B.

With reference to FIG. 2, when a dynamic subframe structure is used, a transient may occur in the transmission power of the terminal. More specifically, for PUSCH transmission, the terminal performs power-on operation at the start of the PUSCH region. Here, a delay time may occur when the hardware is ramped up for PUSCH transmission, which may be referred to as a power transient time. In this example, the power transient time for PUSCH transmission is indicated by reference numeral 210. Similarly, at the point where PUSCH transmission ends, the terminal performs power-off operation for the PUSCH. Here, a delay time may occur when the hardware is ramped down as indicated by reference numeral 220, which may be referred to as a power transient time. After completing the PUSCH transmission, the terminal performs power-on operation for PUCCH transmission. Here, as indicated by reference numeral 230, a delay time may occur when the hardware is ramped up for PUCCH transmission. Similarly, at the point where PUCCH transmission ends, the terminal performs power-off operation for the PUCCH. Here, a delay time may occur when the hardware is ramped down as indicated by reference numeral 240, which may be referred to as a power transient time. There is a requirement in the LTE system that each of the power transient times as indicated by reference numerals 210 to 240 must be less than or equal to 20 μs.

In 5G systems, the use of a wide bandwidth is being considered to increase the data rates in the downlink and uplink. For example, in the LTE system using a subcarrier spacing of 15 kHz, for each component carrier (CC), a maximum system bandwidth of 20 MHz may be used and 100 resource blocks (RBs) may be used. In contrast, a 5G system may use a system bandwidth of 100 MHz or 200 MHz per CC, and 500 RBs may be used at a system bandwidth of 100 MHz in the case of a 15 kHz subcarrier spacing. Here, when the difference between the number of RBs used for PUSCH transmission and the number of RBs used for S-PUCCH transmission is large, a large difference may occur between the transmission power for the PUSCH and the transmission power for the S-PUCCH. This may be a factor for increasing the power transient time described in the example of FIG. 2. For example, assume that 100 RBs are used for PUSCH transmission and 1 RB is used for S-PUCCH transmission. Then, the difference between the transmission power for the PUSCH and the transmission power for the S-PUCCH may become 20 dB. As the difference in the transmission power increases, the time required for ramping up and ramping down the power (power transient time) may be increased to set up the transmission power in the hardware. As a result, when the terminal performs simultaneous transmission of the PUSCH and the S-PUCCH, it may fail to satisfy the requirement for the power transient time.

The LTE system uses digital beamforming to increase the data rate. In the 5G system operating in the mmWave band, the distance between antennas can be shortened because the wavelength (X) of the radio wave is short. That is, compared to the LTE system, the 5G system can have a larger number of antennas in the same area. However, operating a large number of digital chains to support a large number of antennas may increase implementation complexity of the base station and the terminal. To solve this problem, hybrid beamforming may be used in a system supporting the mmWave band. In a system supporting hybrid beamforming, beams are formed by a combination of analog beamforming and digital beamforming. Hence, the system supporting hybrid beamforming may have fewer digital chains compared to a system supporting full digital beamforming, reducing implementation complexity. However, signal processing in the analog domain can cause a longer delay time compared to signal processing in the digital domain. As a result, in the system supporting hybrid beamforming, the power transient time described with reference to FIG. 2 may become longer due to signal processing in the analog domain.

Meanwhile, because the 5G system can support a larger subcarrier spacing, it can have a shorter symbol length compared to the LTE system. For example, in a 5G system using a 120 kHz subcarrier spacing, the symbol length is 8 times shorter than that of the LTE system using a 15 kHz subcarrier spacing. Because the short symbol length requires faster signal processing, if the difference in the transmission power between the PUSCH and the S-PUCCH becomes large, it may be difficult for the terminal to adjust the transmission power due to the increase in the ramping up and ramping down times. More specifically, if the LTE system using a 15 kHz subcarrier spacing is assumed to have a power transient time of 20 μs, the power transient time of the 5G system using a 120 kHz subcarrier spacing is 2.5 μs. That is, the terminal should be able to change the transmission power from PUSCH transmission to S-PUCCH transmission within 5 μs (ramping down PUSCH transmission power for 2.5 μs+ramping up S-PUCCH transmission power for 2.5 μs). Hence, when the transmission power difference between the PUSCH and the S-PUCCH is large, the terminal may fail to satisfy this requirement (transition from PUSCH transmission power to S-PUCCH transmission power within 5 s).

To address the above problem, placing a limitation on the S-PUCCH transmission power may be considered. For example, when the terminal needs to successively transmit the PUSCH and the S-PUCCH in a specific slot, the transmission power of the S-PUCCH ($P_{S-PUCCH}$) may be determined based on the transmission power of the PUSCH ($P_{PUSCH}$). More specifically, the transmission power of the S-PUCCH may be determined by min{$P_{PUSCH}$, $P_{S-PUCCH}$}. That is, if $P_{PUSCH}$ is greater than $P_{S-PUCCH}$, the terminal may calculate the transmission power of the S-PUCCH by using Equation 1 above. If $P_{PUSCH}$ is less than $P_{S-PUCCH}$, the terminal may set the transmission power of the S-PUCCH to $P_{PUSCH}$. This method can prevent an increase in the power transient time that may be caused by a large difference in the transmission power between the PUSCH and the S-PUCCH. However, the coverage requirements for the PUSCH and the S-PUCCH may be different, and the SINR requirements for PUSCH reception and S-PUCCH reception at the base station may be different. Hence, if the transmission power of the S-PUCCH is determined based on min{$P_{PUSCH}$, $P_{S-PUCCH}$}, a situation may occur where the transmission performance of the S-PUCCH cannot be guaranteed.

As another example of limiting the transmission power of the S-PUCCH, when the terminal needs to successively transmit the PUSCH and the S-PUCCH in a specific slot, the transmission power of the S-PUCCH may be determined by max{$P_{PUSCH}$, $P_{S-PUCCH}$}. That is, if $P_{PUSCH}$ is less than $P_{S-PUCCH}$, the terminal may calculate the transmission power of the S-PUCCH by using Equation 1 above. If $P_{PUSCH}$ is greater than or equal to $P_{S-PUCCH}$, the terminal may set the transmission power of the S-PUCCH to $P_{PUSCH}$. This method can prevent an increase in the power transient time that may be caused by a large difference in the transmission power between the PUSCH and the S-PUCCH. However, the S-PUCCH is transmitted with a transmission power greater than an actually required transmission power to satisfy the coverage requirement for the S-PUCCH and the SINR requirement for S-PUCCH reception at the base station. Hence, this may unnecessarily increase the power consumption of the terminal and increase the amount of interference caused to neighbor cells.

As another method for preventing a problem caused by an increase in the difference between $P_{PUSCH}$ and $P_{S-PUCCH}$ when the terminal needs to successively transmit the PUSCH and the S-PUCCH in a specific slot, it may be possible to use the scheduling of the base station and prior negotiation between the terminal and the base station.

Figure 3A:
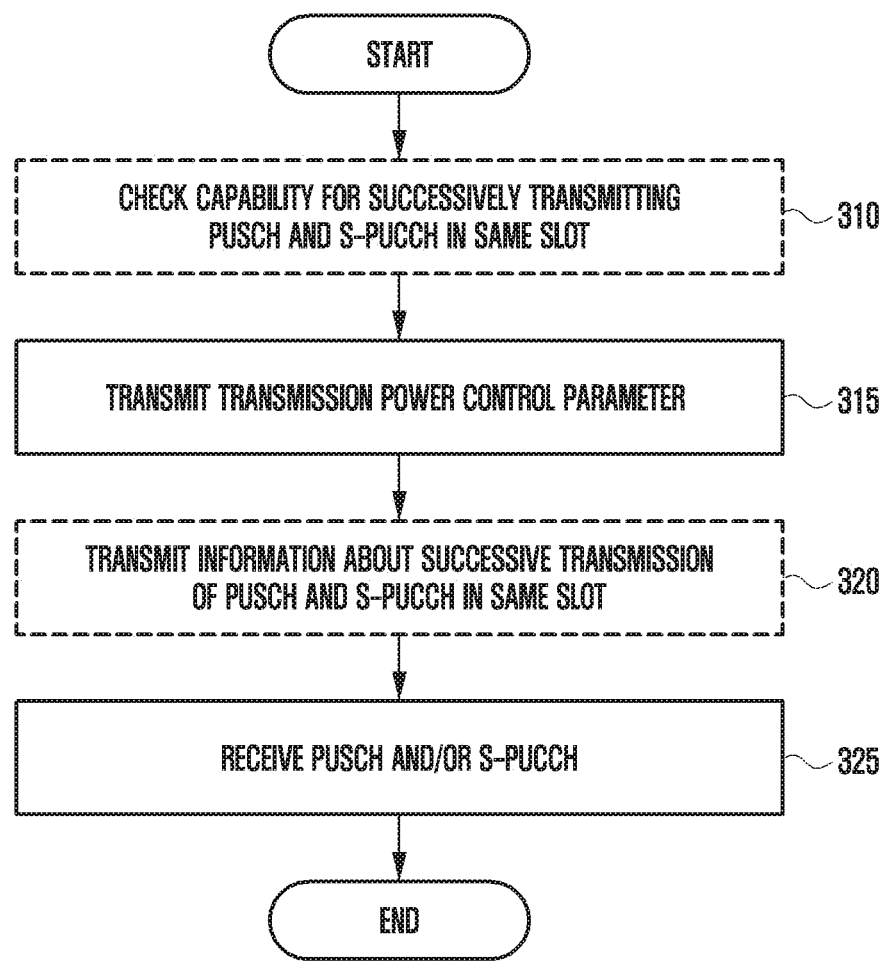
FIG. 3A illustrates a procedure of the base station to prevent a problem caused by an increasing difference between PPUSCH and PS-PUCCH when the terminal successively performs PUSCH transmission and S-PUCCH transmission in a specific slot.
Figure 3B:
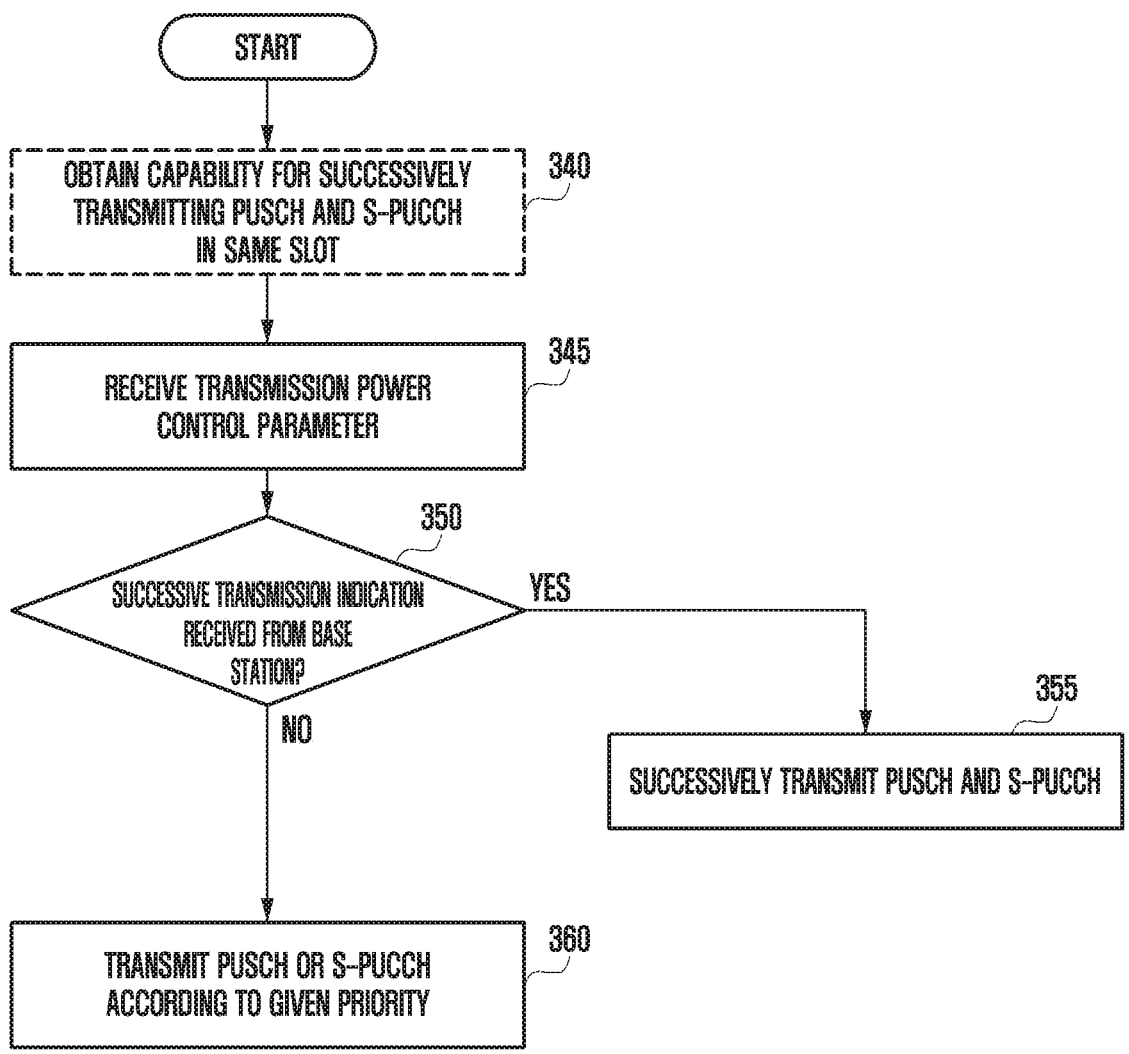
FIG. 3B illustrates a procedure of the terminal to prevent a problem caused by an increasing difference between PPUSCH and PS-PUCCH when the terminal successively performs PUSCH transmission and S-PUCCH transmission in a specific slot.

For example, FIG. 3A illustrates operations of the base station to prevent a problem caused by a large difference between $P_{PUSCH}$ and $P_{S-PUCCH}$, and FIG. 3B illustrates operations of the terminal.

With reference to FIG. 3A, the base station may communicate with the terminal to control the uplink transmission power of the terminal. A step indicated by a dotted line on the drawing may be selectively performed.

At step 310, the base station may determine whether a specific terminal can successively transmit the PUSCH and the S-PUCCH in the same slot. To this end, the base station may obtain information about the uplink transmission capability of the terminal, and this may be performed through a capability negotiation process between the base station and the terminal. For example, if the hardware of a specific terminal does not meet the requirement for the power transient time between the PUSCH and the S-PUCCH, the terminal may be unable to successively transmit the PUSCH and the S-PUCCH in the same slot. Hence, the base station may not command such a terminal to successively transmit the PUSCH and the S-PUCCH.

At step 315, the base station may transmit a parameter for controlling the uplink transmission power to the terminal. More specifically, the base station may determine the capability of the terminal for the successive transmission of the PUSCH and the S-PUCCH and transmit a transmission power control parameter corresponding to the capability. For example, the transmission power control parameter applicable to a terminal capable of successively transmitting the PUSCH and the S-PUCCH may be different from the transmission power control parameter applicable to a terminal incapable of successively transmitting the PUSCH and the S-PUCCH. In one embodiment, the base station may transmit the above parameter to a terminal without checking the transmission capability of the terminal. The base station may assume that every terminal accessing the cell satisfies the requirement for the power transient time, and thus the capability negotiation of the terminal on whether the PUSCH and the S-PUCCH are successively transmitted may be omitted.

At step 320, the base station may transmit information about the successive transmission of the PUSCH and the S-PUCCH in the same slot to the terminal. More specifically, even if the capability of the terminal can support successive transmission of the PUSCH and the S-PUCCH (or, it is assumed that all terminals connected to the base station can successively transmit the PUSCH and the S-PUCCH), the base station may or may not allow successive transmission of the PUSCH and the S-PUCCH in a specific slot for scheduling flexibility. For example, if the number of RBs allocated to the scheduled PUSCH differs by a preset value or more from the number of RBs allocated to the scheduled S-PUCCH, the base station may determine not to allow successive transmission of the PUSCH and the S-PUCCH. The base station may transmit information about whether to allow the successive transmission to the terminal through at least one of UE-specific RRC signaling, the group common PDCCH, or the UE-specific PDCCH, and such a command may be composed and transmitted in various ways. For example, information on whether successive transmission of the PUSCH and the S-PUCCH is allowed in a specific slot may be explicitly transmitted to the terminal as 1-bit information. More specifically, a bit value of 0 may indicate a case where successive transmission of the PUSCH and the S-PUCCH is not allowed, and a bit value of 1 may indicate a case where successive transmission is allowed. As another example, whether the PUSCH is transmitted in a specific slot ($n^{th}$ slot) may be notified by the base station to the terminal through UL DCI transmitted in the downlink in the same slot ($n^{th}$ slot) or the previous slot ($n-k^{th}$ slot). Here, k may be a value known in advance to the terminal through RRC signaling or a value agreed in advance between the base station and the terminal. For example, the value of k may be one of 0, 1, 2, ... max. On the other hand, whether the S-PUCCH is transmitted in the $n^{th}$ slot may be notified by the base station to the terminal through DL DCI or UL DCI transmitted in the downlink in the same slot ($n^{th}$ slot) or the previous slot ($n-l^{th}$ slot). Here, l is a value known in advance to the terminal through RRC signaling. For example, the value of l may be one of 0, 1, 2, ... max. Here, k and l may be different values, and max for k may be different from max for l.

At step 325, the base station may receive at least one of the PUSCH or the S-PUCCH from the terminal based on the information transmitted in the previous step. More specifically, the base station may expect successive transmission of the PUSCH and the S-PUCCH from a terminal that is allowed to successively transmit the PUSCH and the S-PUCCH in a specific slot, and may successively receive the PUSCH and the S-PUCCH. However, the base station may expect transmission of only one of the PUSCH and the S-PUCCH from a terminal that is not allowed to successively transmit the PUSCH and the S-PUCCH in a specific slot. Here, expecting transmission of the PUSCH and the S-PUCCH may include monitoring the corresponding channel at a corresponding uplink resource. In this case, the base station may transmit information indicating successive transmission of the PUSCH and the S-PUCCH to the terminal. More specifically, the base station may notify the terminal of whether the terminal should transmit the PUSCH or the S-PUCCH through the group common DCI or the UE-specific DCI as described above. The base station may notify the terminal of successive transmission of the PUSCH and the S-PUCCH only, and the terminal may transmit either the PUSCH or the S-PUCCH in a specific slot according to a rule agreed in advance with the base station. In this case, the indication indicating the successive transmission may be transmitted through the control channel of a corresponding slot or may be transmitted to the terminal in a previous slot preceding a preset number of slots. The base station may receive either the PUSCH or the S-PUCCH in a specific slot according to a rule agreed in advance with the terminal. These rules may be defined in various ways and may include the following examples.

UCI is not multiplexed and transmitted on PUSCH
    PUSCH is dropped and only S-PUCCH is transmitted
UCI is multiplexed and transmitted on PUSCH
    if HARQ-ACK/NACK information is multiplexed on PUSCH, S-PUCCH is dropped and PUSCH is transmitted
    if HARQ-ACK/NACK information is not multiplexed on PUSCH, PUSCH is dropped and S-PUCCH is transmitted In the above example, the dropped information item is determined, but not limited to, by giving priority to transmission of the feedback information such as HARQ-ACK/NACK. According to an embodiment, information that is preset or indicated by the base station may be dropped.

FIG. 3B illustrates a procedure of the terminal to prevent a problem caused by an increasing difference between $P_{PUSCH}$ and $P_{S-PUCCH}$.

With reference to FIG. 3B, the terminal may communicate with the base station to control the uplink transmission power. A step indicated by a dotted line on the drawing may be selectively performed.

At step 340, the terminal may perform capability negotiation with the base station about whether the PUSCH and the S-PUCCH can be successively transmitted in the same slot. The capability negotiation may be performed at the request of the base station, and the terminal may transmit information about the uplink transmission capability to the base station. The base station may determine whether to permit successive transmission of the PUSCH and the S-PUCCH in the same slot based on at least one of the uplink transmission capability of the corresponding terminal, transmission capabilities of other terminals in the cell, or scheduling information of terminals in the cell.

At step 345, the terminal may receive uplink transmission power control information from the base station. The uplink transmission power control information may include a parameter for determining the uplink transmission power. In one embodiment, the transmission power control parameter received by a terminal with a capability of successively transmitting the PUSCH and the S-PUCCH may be different from that received by a terminal without such a capability. In another embodiment, all terminals may have the capability of successively transmitting the PUSCH and the S-PUCCH in the same slot. In this case, the capability negotiation with the base station mentioned above may be omitted. When terminals perform capability negotiation with the base station, the terminal having the successive transmission capability for the PUSCH and the S-PUCCH and the terminal not having the successive transmission capability may receive different uplink transmission power control parameters from the base station.

At step 350, the terminal may receive information related to the successive transmission of the PUSCH and the S-PUCCH in a specific slot from the base station. Thereby, the terminal may selectively perform the operation of step 355 or step 360.

In one embodiment, the terminal having an uplink transmission capability for successively transmitting the PUSCH and the S-PUCCH in the same slot may receive a corresponding uplink transmission power control parameter from the base station and/or receive a separate indication of the successive transmission of the PUSCH and the S-PUCCH from the base station. For example, the base station may permit the terminal having the successive transmission capability of the PUSCH and the S-PUCCH to transmit only one of the PUSCH and the S-PUCCH in a specific slot for scheduling flexibility. Hence, even a terminal having the capability of successively transmitting the PUSCH and the S-PUCCH may receive a command indicating whether to successively transmit the PUSCH and the S-PUCCH in a specific slot from the base station. Information indicating whether to successively transmit the PUSCH and the S-PUCCH in a specific slot may be received by the terminal through the group common DCI or UE-specific DCI. The terminal having received a command for successively transmitting the PUSCH and the S-PUCCH in the same slot from the base station may successively transmit the PUSCH and the S-PUCCH. The terminal having not received a permission for successively transmitting the PUSCH and the S-PUCCH from the base station may transmit either the PUSCH or the S-PUCCH according to the command from the base station. As another example, a terminal without the successive transmission capability of the PUSCH and the S-PUCCH or a terminal having failed to receive a permission for successive transmission of the PUSCH and the S-PUCCH may transmit either the PUSCH or the S-PUCCH according to a preset priority (or, preset rule) without a separate command from the base station. The rule is the same as described in FIG. 3A. As the base station does not know which channel the terminal transmits among the PUSCH and the S-PUCCH, the base station may perform blind decoding. In one embodiment, when the terminal determines whether to successively transmit the PUSCH and the S-PUCCH in a specific slot based on the uplink transmission power control parameter set by the base station, the base station may perform blind decoding on the signal transmitted by the terminal and obtain information transmitted by the terminal based on the blind decoding result.

Figure 4A:
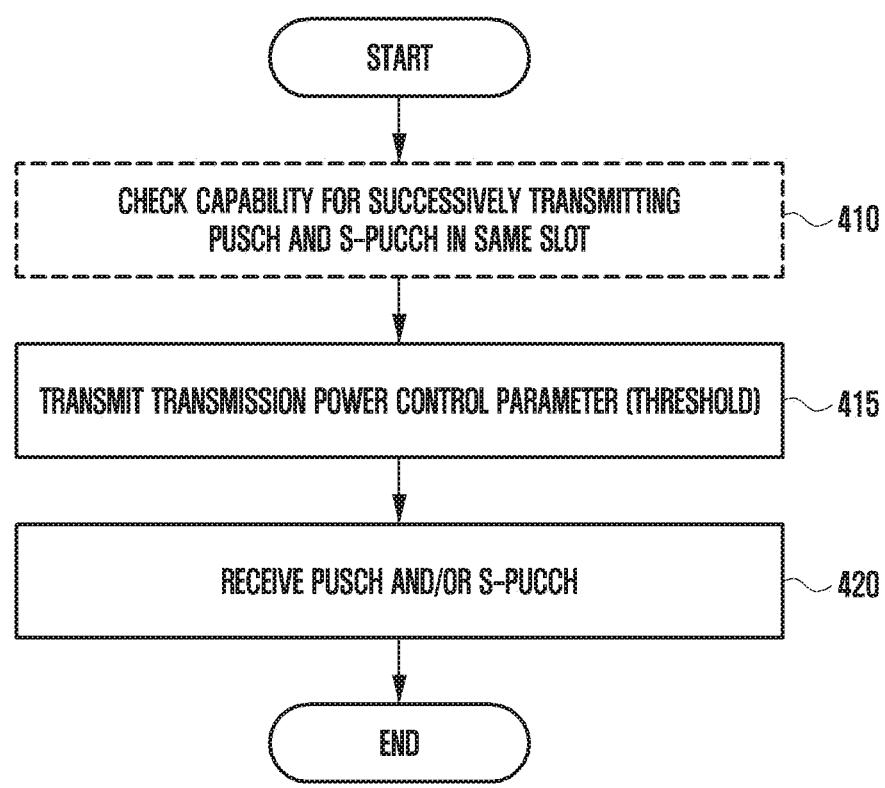
FIG. 4A illustrates another procedure of the base station to prevent a problem caused by an increasing difference between PPUSCH and PS-PUCCH when the terminal successively performs PUSCH transmission and S-PUCCH transmission in a specific slot.

FIG. 4A illustrates another procedure of the base station to prevent a problem caused by an increasing difference between $P_{PUSCH}$ and $P_{S-PUCCH}$.

With reference to FIG. 4A, the base station may communicate with the terminal to control the uplink transmission power of the terminal. A step indicated by a dotted line on the drawing may be selectively performed. Step 410 for determining the successive transmission capability of the PUSCH and the S-PUCCH in the same slot may be performed in the same manner as step 310 of FIG. 3A.

At step 410, the base station may transmit a parameter for controlling the uplink transmission power to the terminal. In one embodiment, the base station may not transmit information about successive transmission of the PUSCH and the S-PUCCH, and may configure the parameter so that the terminal can determine whether to successively transmit the PUSCH and the S-PUCCH. More specifically, the base station may transmit transmission power control parameters including a threshold to the terminal. Here, the threshold may be a value (Y [dB] or Y [dBm]) representing the maximum allowable difference in the transmission power between the PUSCH and the S-PUCCH, or a value (x RBs) representing the maximum allowable difference between the number of RBs allocated to the PUSCH and the number of RBs allocated to the S-PUCCH causing a difference in the transmission power between the PUSCH and the S-PUCCH.

At step 420, the base station may receive at least one of the PUSCH or the S-PUCCH from the terminal based on the information transmitted in the previous step. More specifically, when the base station has configured Y [dB] or Y [dBm] as a threshold value for the terminal in the previous step, as the base station does not exactly know the transmission power of the terminal and may not know whether the terminal successively transmits the PUSCH and the S-PUCCH or transmits only one of the PUSCH and the S-PUCCH, the base station may perform blind decoding on the signal transmitted by the terminal.

Figure 4B:
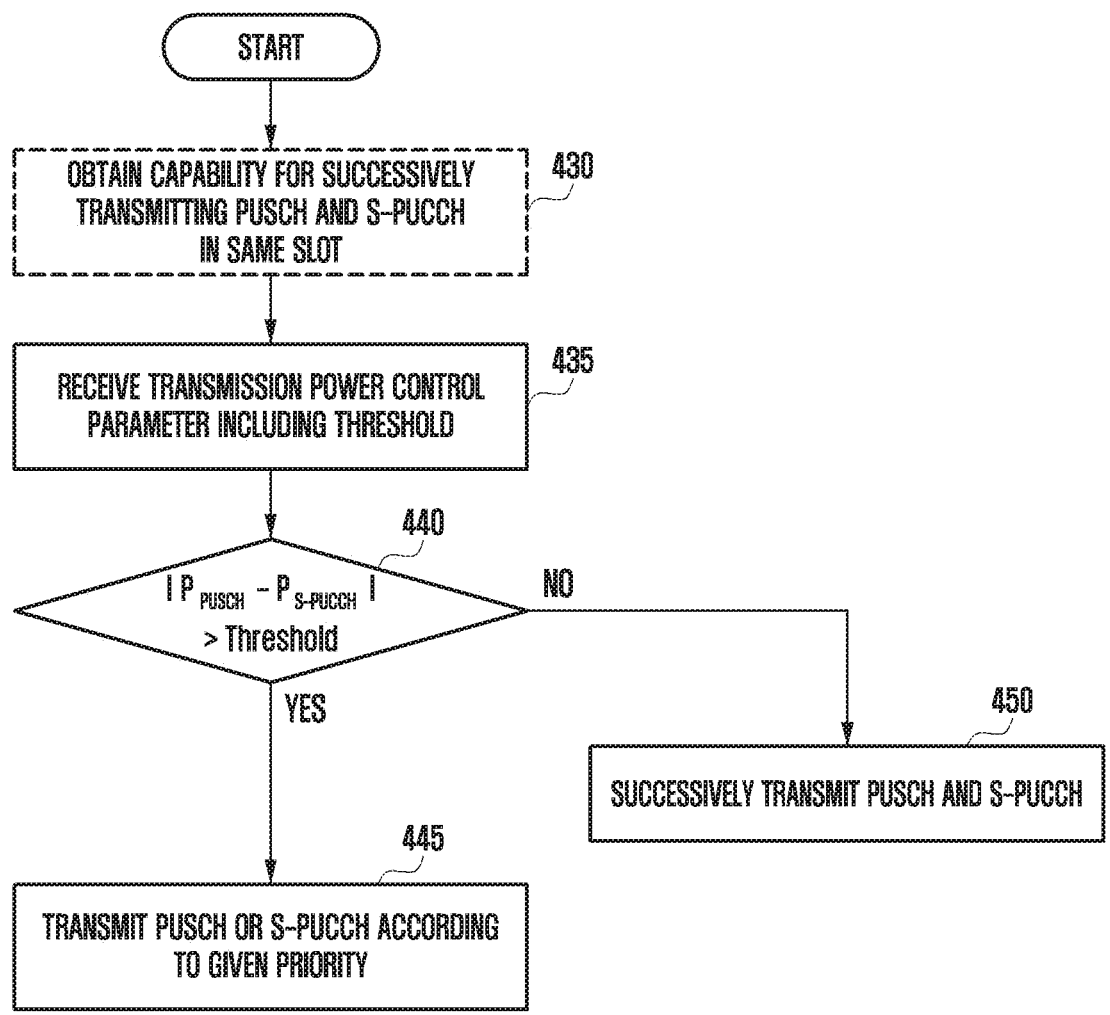
FIG. 4B illustrates another procedure of the terminal to prevent a problem caused by an increasing difference between PPUSCH and PS-PUCCH when the terminal successively performs PUSCH transmission and S-PUCCH transmission in a specific slot.

FIG. 4B illustrates another procedure of the terminal to prevent a problem caused by an increasing difference between $P_{PUSCH}$ and $P_{S-PUCCH}$.

With reference to FIG. 4B, the terminal may communicate with the base station to control the uplink transmission power. A step indicated by a dotted line on the drawing may be selectively performed.

At step 430, the terminal may perform capability negotiation with the base station about whether the PUSCH and the S-PUCCH can be successively transmitted in the same slot. The capability negotiation may be performed at the request of the base station, and the terminal may transmit information about the uplink transmission capability to the base station. The base station may determine whether to permit successive transmission of the PUSCH and the S-PUCCH in the same slot based on at least one of the uplink transmission capability of the corresponding terminal, transmission capabilities of other terminals in the cell, or scheduling information of terminals in the cell. Step 430 for determining the successive transmission capability of the PUSCH and the S-PUCCH in the same slot may be performed in the same manner as step 340 of FIG. 3B.

At step 435, the terminal may receive uplink transmission power control information from the base station. The uplink transmission power control information may include a parameter for determining the uplink transmission power. In an embodiment, the base station does not notify the terminal of whether the PUSCH and the S-PUCCH are successively transmitted, but the terminal may determine whether to successively transmit the PUSCH and the S-PUCCH in a specific slot based on the parameter transmitted by the base station. To this end, the terminal may receive transmission power control parameters including a threshold value from the base station.

The terminal may determine whether the difference between $P_{PUSCH}$ and $P_{S-PUCCH}$ is greater than the threshold set by the base station at step 430, and may perform the operation of step 445 or step 450 accordingly. More specifically, if the difference between $P_{PUSCH}$ and $P_{S-PUCCH}$ is less than or equal to the threshold set by the base station, the terminal may successively transmit the PUSCH and the S-PUCCH in a corresponding slot. Here, the transmission power of the PUSCH and the S-PUCCH may be determined by the terminal based on the transmission power parameters configured by the base station. For example, the terminal may determine the transmission power associated with the uplink channel by using Equation 1 above. On the other hand, if the difference between $P_{PUSCH}$ and $P_{S-PUCCH}$ is greater than the threshold set by the base station, the terminal may transmit only one of the PUSCH and the S-PUCCH in a specific slot according to the rule (or priority) agreed with the base station. In this case, the rules agreed between the terminal and the base station may be defined in various ways and may include the following examples.

Figure 5:
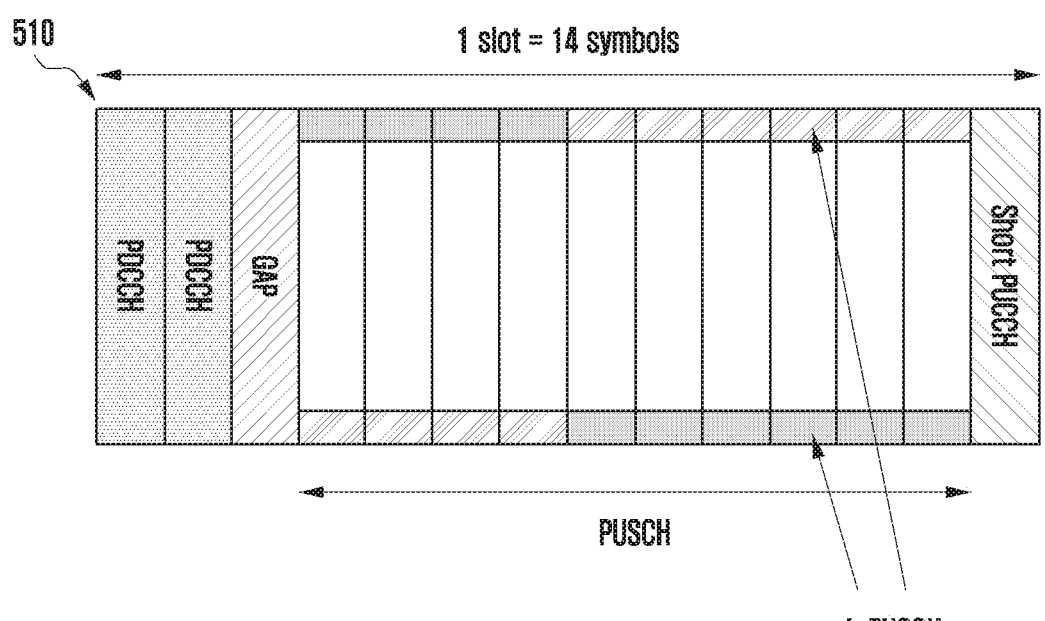
FIG. 5 shows an example in which long PUCCH (L-PUCCH) and S-PUCCH coexist in a slot including 14 symbols.
Figure 5:
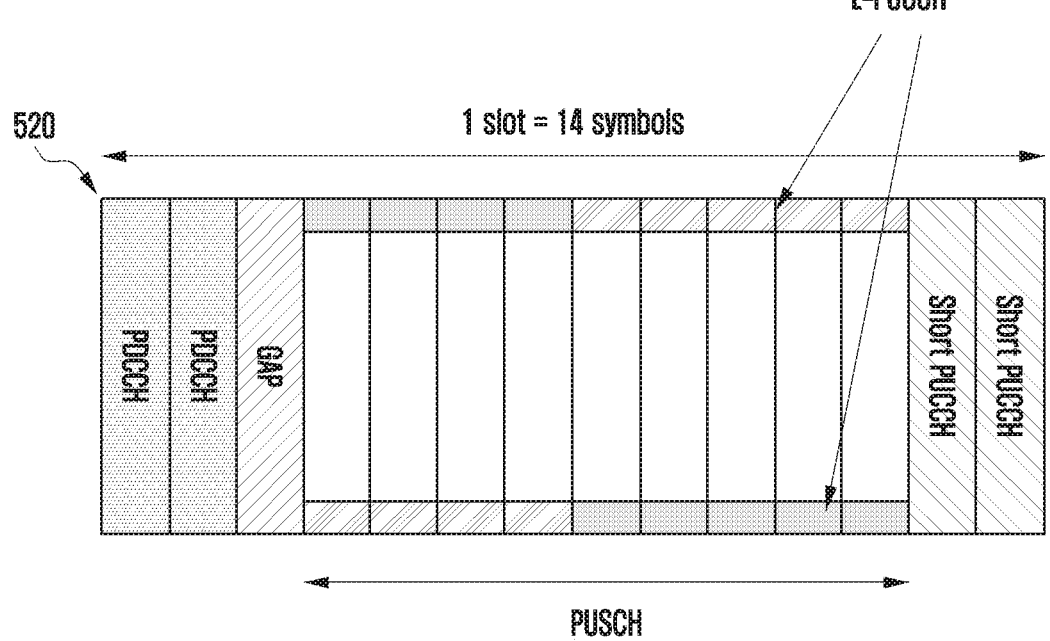

UCI is not multiplexed and transmitted on PUSCH
    PUSCH is dropped and only S-PUCCH is transmitted
UCI is multiplexed and transmitted on PUSCH
    if HARQ-ACK/NACK information is multiplexed on PUSCH, S-PUCCH is dropped and PUSCH is transmitted
    if HARQ-ACK/NACK information is not multiplexed on PUSCH, PUSCH is dropped and S-PUCCH is transmitted FIG. 5 shows an example in which long PUCCH (L-PUCCH) and S-PUCCH coexist in a slot including 14 symbols.

With reference to FIG. 5, resources for the L-PUCCH and the S-PUCCH may be allocated in each slot 510 or 520. Here, L-PUCCH and S-PUCCH are a term for referring to a corresponding resource region, and the terms representing resource regions may be referred to in various ways.

In one embodiment, the terminal may successively transmit the L-PUCCH and the S-PUCCH in a specific slot. For example, the terminal may use L-PUCCH or S-PUCCH according to the type of uplink control information (UCI) and the size (number of bits) of UCI. More specifically, feedback information related to the CQI or hybrid beamforming may have a larger number of bits than HARQ-ACK feedback information. Hence, UCI data with a large number of bits may be transmitted on the L-PUCCH, and scheduling requests (SR) and HARQ-ACK feedback with a relatively small number of bits may be transmitted on the S-PUCCH.

As another example, UCI data with a high latency requirement (e.g., short delay time) may be transmitted on the S-PUCCH, and UCI data with a low latency requirement may be transmitted on the L-PUCCH. Therefore, the operations for the PUSCH and the S-PUCCH described in FIGS. 3A, 3B, 4A, and 4B may be interpreted as the operations for the L-PUCCH and the S-PUCCH. Here, the rule (priority) agreed in advance between the base station and the terminal may be different for the transmission of PUSCH/S-PUCCH and for the transmission of L-PUCCH/S-PUCCH. For example, the rule agreed between the terminal and the base station for the transmission of L-PUCCH/S-PUCCH may be as follows.

HARQ-ACK is transmitted on S-PUCCH rather than on L-PUCCH
L-PUCCH is dropped and only S-PUCCH is transmitted
HARQ-ACK is transmitted on L-PUCCH rather than on S-PUCCH
S-PUCCH is dropped and L-PUCCH is transmitted In the above example, the dropped information item is determined, but not limited to, by giving priority to transmission of the feedback information such as HARQ-ACK/NACK. According to an embodiment, information that is preset or indicated by the base station may be dropped.

As another example of the rule agreed between the terminal and the base station, if the terminal does not support successive transmission of the S-PUCCH and the L-PUCCH, if the base station does not allow successive transmission of the S-PUCCH and the L-PUCCH in a specific slot, or if the threshold configured by the base station is not satisfied in a specific slot, the rule may be set so that the terminal can give priority to S-PUCCH transmission being sensitive to latency and drop L-PUCCH transmission.

Meanwhile, the threshold for determining successive transmission of the PUSCH and the S-PUCCH may be different from the threshold for determining successive transmission of the L-PUCCH and the S-PUCCH. In addition, parameters and equations for transmission power control of the PUSCH, the S-PUCCH, and the L-PUCCH may be different from each other. For example, Equation 1 may be used to control the transmission power of the L-PUCCH. However, as the number of symbols that can be used for the L-PUCCH may vary from 4 to 14, to maintain the same coding rate, it is necessary to increase or decrease the frequency resources according to the number of symbols. More specifically, assume that the size of UCI payload transmitted on the L-PUCCH is X bits, and assume that the coding rate is $R_1$ when the number of symbols in the L-PUCCH is $L_1$ and the frequency resource (the number of RBs or the number of subcarriers) is $m_1$. Here, $R_1=X/(L_1 \cdot m_1)$. Assuming transmission of the same sized UCI data (X bits), to maintain the same coding rate, if the number of symbols in the L-PUCCH is changed to $L_2$, the frequency resource of the L-PUCCH should be changed to $m_2$. That is, $R_1=X/(L_1 \cdot m_1)=(L_2 \cdot m_2)$. Hence, Equation 1 can be changed to Equation 7 below in consideration of the L-PUCCH frequency resource $M_{L\text{-}PUCCH}$ (transmission bandwidth).

$$P_{L\text{-}PUCCH}(i)=\min\{P_{CMAX}(i), 10 \log_{10}(M_{L\text{-}PUCCH})+P_{0\_PUCCH}+PL+h(n_{CQI},n_{HARQ},n_{SR})+\Delta_{F\_PUCCH}(F)+\Delta_{TxD}(F)+g(i)\}[\text{dBm}]$$ Equation 7

Equation 7 may be used for the transmission power control of the S-PUCCH in addition to the operations of the base station and the terminal described with reference to FIGS. 3A, 3B, 4A and 4B. However, the dropping of the PUSCH or S-PUCCH described with reference to FIGS. 3A, 3B, 4A and 4B may be undesirable in view of efficient utilization of resources. In addition, Equation 7 may not satisfy the requirement for the power transient time when the PUSCH and the S-PUCCH are successively transmitted. Therefore, the disclosure proposes a S-PUCCH transmission power control method as shown in Equation 8-1.

$$P_{S\text{-}PUCCH}(i)=\min\{P_{CMAX}(i), P_{S\text{-}PUCCH\_OFFSET}(k)+10 \log_{10}(M_{S\text{-}PUCCH})+P_{0\_PUSCH}(j)+\alpha(j)\cdot PL+f(i)\}$$
$$[\text{dBm}]$$ Equation 8-1

In Equation 8-1, $P_{S\text{-}PUCCH\_OFFSET}(k)$ is a parameter that can be configured through UE-specific or cell-specific RRC signaling and is a value that compensates for the difference in the transmission power between the PUSCH and the S-PUCCH. $P_{S\text{-}PUCCH\_OFFSET}(k)$ is a value for satisfying the SINR requirement of S-PUCCH reception and may vary depending on the size of UCI payload (i.e., the number of UCI transmission bits) or the type of UCI payload (i.e., HARQ-ACK, CQI, SR, etc.) transmitted through the S-PUCCH. For example, the S-PUCCH format may be defined according to the size or type of UCI payload transmitted through the S-PUCCH. More specifically, S-PUCCH format 1 may carry 1-bit or 2-bit HARQ-ACK information. S-PUCCH format 2 may support a size of 10 bits and may carry information about HARQ-ACK, CQI, SR or beams in a hybrid beamforming system, or a combination thereof. S-PUCCH format 3 may support a size of 30 bits and may carry information about HARQ-ACK, CQI, SR or beams in a hybrid beamforming system, or a combination thereof similarly to S-PUCCH format 2. Hence, to support various S-PUCCH formats described above, $P_{S\text{-}PUCCH\_OFFSET}(k)$ may have a different value according to the S-PUCCH format (i.e., k may indicate a S-PUCCH format index). $M_{S\text{-}PUCCH}$ represents a frequency resource (transmission bandwidth) for S-PUCCH transmission. $P_0\_PUSCH$ (j) is a parameter for PUSCH transmission power, is given by $P_{0\_NOMINAL\_PUSCH}+P_{0\_UE\_PUSCH}$, and is a value configured by the base station to the terminal through higher layer signaling (RRC signaling). Here, $P_{0\_NOMINAL\_PUSCH}$ is a cell-specific value and $P_{0\_UE\_PUSCH}$ is a UE-specific value. A cell-specific value may be transmitted by the base station through cell-specific RRC signaling (system information block (SIB)), and a UE-specific value may be transmitted by the base station through dedicated RRC signaling (UE-specific RRC signaling). Here, j means a PUSCH grant scheme, and more specifically, j=0 means a semi-persistent grant, j=1 means a dynamic scheduled grant, and j=2 means a PUSCH grant for a random access response. α(j) is a value for compensating for the path-loss, and the base station may configure different values according to the PUSCH grant scheme. For example, when j=0 or j=1, α(j) can be configured by the base station in a cell-specific way to be one of {0, 0.4, 0.5, 0.6, 0.7, 0.8, 0.9, 1}. When j=2, α(j) may be set to 1 (α(j)=1). In addition, PL is a path loss value calculated by the terminal and can be calculated based on the received power of a reference signal (RS) transmitted by the base station via a downlink channel. Here, the RS of the downlink channel for calculating the path loss may be a channel state information reference signal (CSI-RS) or a synchronization signal (SS).

Meanwhile, f (i) is a parameter for performing closed-loop power control and may vary depending on whether accumulation-based power control or absolute-value based power control is performed. Whether to perform accumulation based power control or absolute-value based power control may be notified to the terminal through higher layer signaling (dedicated RRC signaling). For example, when accumulation-enabled=on, the terminal may perform accumulation based power control, and when accumulation-enabled=off, the terminal may perform absolute-value based power control. Alternatively, the base station may transmit information on whether absolute-value based power control is performed to the terminal. In this case, when the corresponding information indicates "off", the terminal may perform accumulation based power control.

For accumulation-based power control, f (i)=f (i−1)+ $\delta_{PUSCH}$ (i−$K_{PUSCH}$). That is, the value of f (i) at the $i^{th}$ subframe is given by summing the value of f (i−1) at the previous subframe (i.e., i−$1^{th}$ subframe) and the value of $\delta_{PUSCH}$ transmitted to the terminal via DCI through the PDCCH at the i−$K_{PUSCH}^{th}$ subframe. $K_{PUSCH}$ may be configured by the base station for each terminal through RRC signaling. $K_{PUSCH}$ is a parameter related to the capability of the terminal and is a value obtained by the base station from the terminal when the base station performs capability negotiation with the terminal. Based on this, the base station may determine how fast a specific terminal should perform uplink transmission after receiving the downlink PDCCH. Based on the determination result, the base station may configure the $K_{PUSCH}$ value through RRC signaling or notify it to the terminal through the group common DCI or UE-specific DCI. $K_{PUSCH}$ may have different values in the FDD system and the TDD system.

For absolute-value based power control, f(i)=$\delta_{PUSCH}$(i−$K_{PUSCH}$). That is, the value of f (i) at the $i^{th}$ subframe is given by the value of $\delta_{PUSCH}$ transmitted to the terminal via DCI through the PDCCH at the i−$K_{PUSCH}^{th}$ subframe without accumulation. $K_{PUSCH}$ may be configured by the base station through RRC signaling, group common DCI or UE-specific DCI, and may have different values in the FDD system and the TDD system. The $\delta_{PUSCH}$ value used for accumulation based power control and absolute-value based power control may vary depending on the DCI format.

In Equation 8-1, $P_{0\_PUSCH}$(j)+α(j)·PL+f(i) reuses transmission power parameters used for PUSCH transmission at the $i^{th}$ subframe. Through this transmission power control, it is possible to solve the problem caused by the difference in the transmission power between the PUSCH and the S-PUCCH.

Equation 8-2 below may be considered as a variant of Equation 8-1.

$$P_{S\text{-}PUCCH}(i)=\min\{P_{CMAX}(i),P_{S\text{-}PUCCH\_OFFSET}(k)+10\log_{10}(M_{S\text{-}PUCCH})+PL+f(i)\}[dBm]$$ Equation 8-2

In Equation 8-2, $P_{0\_PUSCH}$ (j) of Equation 8-1 is not used, and the value of $P_{S\text{-}PUCCH\_OFFSET}$ (k) may include the value of $P_{0\_PUSCH}$ (j). For reliable transmission of the control channel, a (j) can always be set to 1. In Equation 8-1, f (i) is a closed-loop power control parameter to be used for the PUSCH at the $i^{th}$ subframe, and $\delta_{PUSCH}$ and $K_{PUSCH}$ are used for f (i). In Equation 8-2, f (i) may indicate a closed-loop power control parameter to be used for the S-PUCCH at the $i^{th}$ subframe, and $\delta_{S\text{-}PUCCH}$ and $K_{S\text{-}PUCCH}$ may be used for f (i). In Equation 8-2, as in Equation 8-1, the base station may indicate whether to use accumulated values or absolute values for f (i) through RRC signaling. Alternatively, unlike Equation 8-1, either accumulated values or absolute values may be used without an RRC configuration from the base station.

Equation 8-3 below may be considered as a variant of Equation 8-2.

$$P_{S\text{-}PUCCH}(i)=\min\{P_{CMAX}(i),P_{S\text{-}PUCCH\_OFFSET}+h(n_{CQI},n_{HARQ},n_{SR})+10\log_{10}(M_{S\text{-}PUCCH})+PL+f(i)\}[dBm]$$ Equation 8-3

$P_{S\text{-}PUCCH\_OFFSET}$(k) in Equation 8-2 is a parameter that can vary according to the size (number of bits) or type (e.g., CQI, HARQ-ACK, SR, or beam) of the control information transmitted through the S-PUCCH (that is, the value of $P_{S\text{-}PUCCH\_OFFSET}$(k) may vary according to the S-PUCCH format). However, in Equation 8-3, the same value may be used for $P_{S\text{-}PUCCH\_OFFSET}$ regardless of the size or type of the control information transmitted through the S-PUCCH (i.e., the value of $P_{S\text{-}PUCCH\_OFFSET}$ is the same regardless of the S-PUCCH format). To satisfy different requirements (e.g. received SINR at the base station) according to the size or type of the control information, $h(n_{CQI}, n_{HARQ}, n_{SR})$ may be introduced as a parameter as in Equation 1. Here, the value of $h(n_{CQI}, n_{HARQ}, n_{SR})$ in Equation 8-3 may be different from that of $h(n_{CQI}, n_{HARQ}, n_{SR})$ in Equation 1. In Equation 8-1, f (i) means a closed-loop power control parameter to be used for the PUSCH at the $i^{th}$ subframe, and $\delta_{PUSCH}$ and $K_{PUSCH}$ may be used for f(i). However, in Equation 8-3, f (i) may indicate a closed-loop power control parameter to be used for the S-PUCCH at the $i^{th}$ subframe, and $\delta_{S\text{-}PUCCH}$ and $K_{S\text{-}PUCCH}$ (different respectively from $\delta_{PUSCH}$ and $K_{PUSCH}$) may be used for f (i).

Equation 8-4 below may be considered as a variant of Equation 8-3.

$$P_{S\text{-}PUCCH}(i)=\min\{P_{CMAX}(i),P_{S\text{-}PUCCH\_OFFSET}+h(n_{CQI},n_{HARQ},n_{SR})+PL+f(i)+\Delta_{F\_PUCCH}(F)+\Delta_{TxD}(F')\}[dBm]$$ Equation 8-4

In Equation 8-4, $\Delta_{F\_PUCCH}(F)+\Delta_{TxD}(F')$ is added to Equation 8-3 as in Equation 1 above, and $10 \log_{10}(M_{S\text{-}PUCCH})$ is removed from Equation 8-3. $\Delta_{F\_PUCCH}(F)$ is an offset that may vary depending on the S-PUCCH format as in Equation 1. $\Delta_{TxD}(F')$ is a parameter that may vary depending on whether a transmit antenna diversity scheme is used for the S-PUCCH as in Equation 1. In Equation 8-1, f (i) means a closed-loop power control parameter to be used for the PUSCH at the $i^{th}$ subframe, and $\delta_{PUSCH}$ and $K_{PUSCH}$ may be used for f(i). However, in Equation 8-4, f (i) may indicate a closed-loop power control parameter to be used for the S-PUCCH at the $i^{th}$ subframe, and $\delta_{S\text{-}PUCCH}$ and $K_{S\text{-}PUCCH}$ (different respectively from $\delta_{PUSCH}$ and $K_{PUSCH}$) may be used for f (i).

Although not illustrated, it is possible to combine Equation 8-1, Equation 8-2, Equation 8-3, and Equation 8-4 in various ways to provide many variants.

Meanwhile, Equation 9 below may be used as a non-variant of Equation 8-1, Equation 8-2, Equation 8-3, or Equation 8-4.

$$P_{S\text{-}PUCCH}(i)=\min\{P_{CMAX}(i),$$
$$P_{S\text{-}PUCCH\_OFFSET}+PL+10\log_{10}(M_{S\text{-}PUCCH})+\Delta_{F\_PUCCH}(F)+\Delta_{TF}(i)+g(i)\}[dBm]$$ Equation 9

In Equation 9, ΔTF(i) is a parameter for satisfying different error rate requirements according to the UCI payload size (number of bits). $\Delta_{TF}(i)$ can be calculated using $10 \log_{10}(2^{1.25 \cdot BPRE(i)}-1)$, where BPRE(i) means the number of bits per resource element (subcarrier) and may be calculated by using the ratio of the number of bits in the UCI information transmitted at the $i^{th}$ subframe and the number of resource elements (REs) used to transmit the UCI information. $\Delta_{F\_PUCCH}(F)$ is an offset value that varies depending on the S-PUCCH format as specified in Equation 8-4. In Equation 9, g(i) means a separate closed-loop transmission power control function for the S-PUCCH, and may be different from f(i) specified in Equation 8-1, Equation 8-2, Equation 8-3, or Equation 8-4. However, like f(i) specified in Equation 8-1, Equation 8-2, Equation 8-3, or Equation 8-4, as a variant of Equation 9, g(i) in Equation 9 may indicate a function used for closed-loop transmission power control of the PUSCH.

Meanwhile, in a hybrid beamforming system, the TX beam of the terminal used for PUSCH transmission and the TX beam of the terminal used for S-PUCCH transmission may be different from each other. In addition, the RX beam of the base station used for PUSCH reception may be different from the RX beam of the base station used for S-PUCCH reception. In the description, a pair of the TX beam of the terminal used for PUSCH transmission and the RX beam of the base station used for PUSCH reception is referred to as a PUSCH beam pair (BP), and a pair of the TX beam of the terminal used for S-PUCCH transmission and the RX beam of the base station used for S-PUCCH reception is referred to as a S-PUCCH beam pair (BP). In this case, when the PUSCH and the S-PUCCH are successively transmitted in the same slot, the PUSCH BP and the S-PUCCH BP may be the same or different from each other according to the beam operation scenario of the base station. Hence, for flexible beam operation, the base station may use different values for $P_{0\_PUSCH}(j)$, $\alpha(j)$, $P_{S-PUCCH\_OFFSET}(k)$ specified in Equation 8-1 for each BP.

Figure 6:
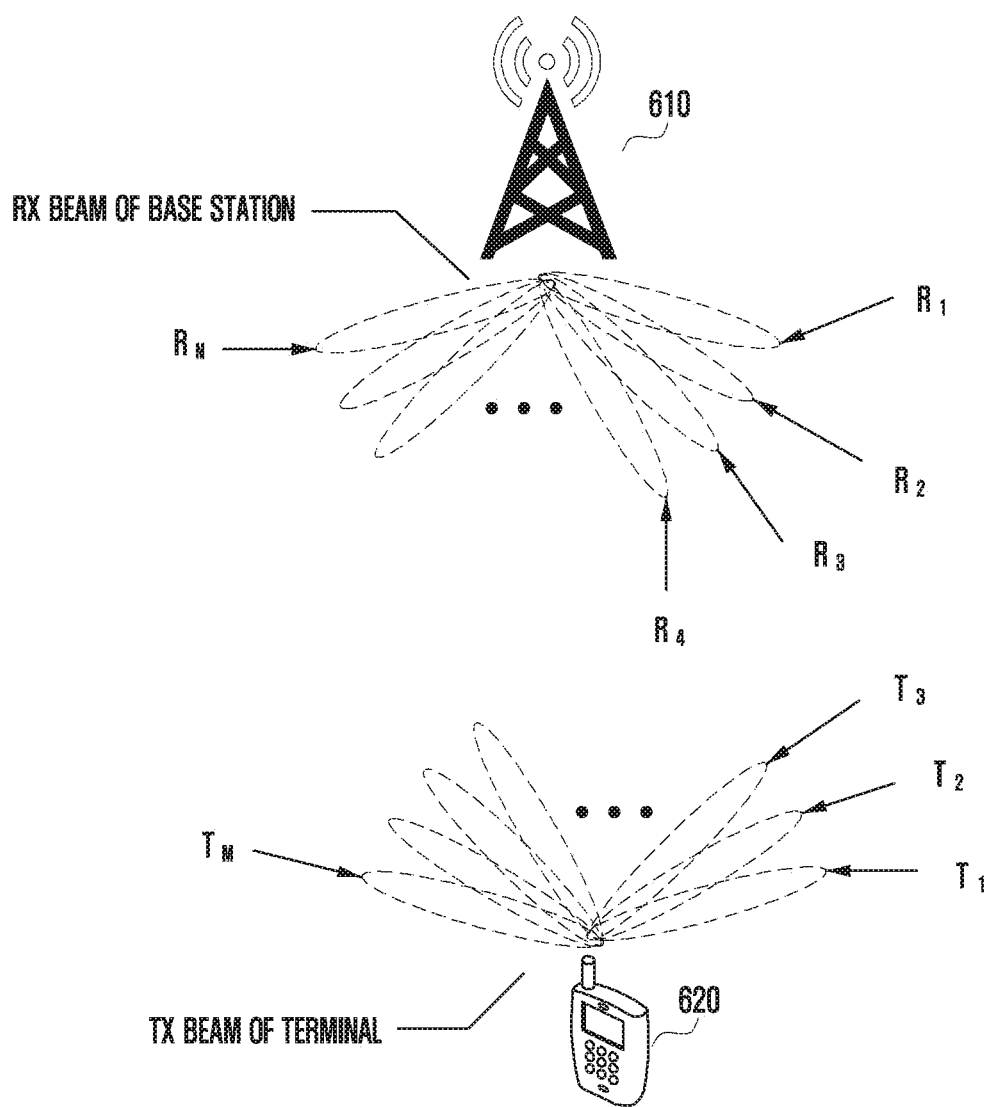
FIG. 6 illustrates beams or beam pairs formed by the base station and the terminal.

FIG. 6 illustrates beams or beam pairs formed by the base station and the terminal. With reference to FIG. 6, the base station 610 may transmit and receive a signal to and from the terminal 620.

In one embodiment, the terminal 620 may transmit a signal by using transmission beams $T_1$ to $T_M$, and the base station 610 may receive a signal by using reception beams $R_1$ to $R_N$. More specifically, the base station 610 may be assumed to form N RX beams, where the indexes of the RX beams are $R_1, R_2, R_3, \ldots, R_{N-1}, R_N$, respectively. The terminal 620 may be assumed to form M TX beams, where the indexes of the TX beams are $T_1, T_2, T_3, \ldots, T_{M-1}, T_M$, respectively. When $P_{11}, P_{12}, P_{ij}, \ldots, P_{NM}$ are formed according to the pairs of the RX beam of the base station 610 and the TX beam of the terminal (i indicates a base station RX beam and j indicates a terminal TX beam), the base station may configure different values for $P_{0\_PUSCH}(j)$, $\alpha(j)$, and $P_{S-PUCCH\_OFFSET}(k)$ according to each BP. That is, the base station 610 may configure settings as follows.

P0-NominalPUSCH-beampair11=$X_1$ [dBm], P0-NominalPUSCH-beampair12=$X_2$ [dBm], . . . , P0-Nominal-PUSCH-beampairNM=$X_{NM}$ [dBm];

P0-UE-PUSCH-beampair11=$Y_1$ [dBm], P0-UE-PUSCH-beampair12=$Y_2$ [dBm], . . . , P0-UE-PUSCH-beampairNM=$Y_{NM}$ [dBm];

PS-PUCCH_OFFSET-beampair11=$Z_1$ [dBm], PS-PUCCH_OFFSET-beampair12=$Z_2$ [dBm], . . . , PS-PUCCH_OFFSET-beampairNM=$Z_{NM}$ [dBm];

Alpha-beampair11=$A_1$, Alpha-beampair12=$A_2$, . . . , Alpha-beampairNM=$A_{NM}$, here, $0 \leq A_{NM} \leq 1$.

In the above example, all $P_{0\_PUSCH}(j)$, $\alpha(j)$, $P_{S-PUCCH\_OFFSET}(k)$ values are configured differently for all BPs. Alternatively, one or two among the $P_{0\_PUSCH}(j)$, $\alpha(j)$, $P_{S-PUCCH\_OFFSET}(k)$ values may be set differently for BPs and the remaining ones may be set identically regardless of the BPs. As N and M refer respectively to the number of beams for the base station and the terminal, the above example illustrates a case of configuring parameter values for all BPs that the base station and the terminal can form. However, the base station may configure parameter values for some selected BPs only, in which case the configured values for $P_{0\_PUSCH}(j)$, $\alpha(j)$, $P_{S-PUCCH\_OFFSET}(k)$ may be different for different terminals.

If different values are configured for $P_{0\_PUSCH}(j)$, $\alpha(j)$, $P_{S-PUCCH\_OFFSET}(k)$ for different BPs, a large amount of signaling overhead may occur when the number of beams managed by the base station and the terminal increases. The main reason for configuring differently values for $P_{0\_PUSCH}(j)$, $\alpha(j)$, $P_{S-PUCCH\_OFFSET}(k)$ for different BPs is that the amount of interference caused to neighbor cells may be different for different BPs. However, adjacent beams or adjacent BPs may have similar strengths of interference to adjacent cells. However, adjacent beams or adjacent BPs may cause similar amounts of interference to neighbor cells. Hence, the base station may group the BPs into beam pair groups (BPG) and configure different values for $P_{0\_PUSCH}(j)$, $\alpha(j)$, $P_{S-PUCCH\_OFFSET}(k)$ for different BPGs. This is as follows.

P0-NominalPUSCH-beampairGroup1=$X_1$ [dBm], P0-NominalPUSCH-beampairGroup2=$X_2$ [dBm], . . . , P0-NominalPUSCH-beampairGroupK=$X_K$ [dBm];

P0-UE-PUSCH-beampairGroup1=$Y_1$ [dBm], P0-UE-PUSCH-beampairGroup2=$Y_2$ [dBm], . . . , P0-UE-PUSCH-beampairGroupK=$Y_K$ [dBm];

PS-PUCCH_OFFSET-beampair11=$Z_1$ [dBm], PS-PUCCH_OFFSET-beampair12=$Z_2$ [dBm], . . . , PS-PUCCH_OFFSET-beampairNM=$Z_K$ [dBm];

Alpha-beampairGroup1=$A_1$, Alpha-beampairGroup2=$A_2$, . . . , Alpha-beampairGroupK=$A_K$, here, $0 \leq A_K \leq 1$.

In the above example, all $P_{0\_PUSCH}(j)$, $\alpha(j)$, $P_{S-PUCCH\_OFFSET}(k)$ values are configured differently for all BPGs. Alternatively, one or two among the $P_{0\_PUSCH}(j)$, $\alpha(j)$, $P_{S-PUCCH\_OFFSET}(k)$ values may be set differently for BPGs and the remaining ones may be set identically regardless of the BPGs. K indicates a case of configuring parameter values for all BPGs that the base station and the terminal can form. However, the base station may configure parameter values for some selected BPGs only, in which case the configured values for $P_{0\_PUSCH}(j)$, $\alpha(j)$, $P_{S-PUCCH\_OFFSET}(k)$ may be different for different terminals.

The above-described different configurations for different BPs or BPGs may be transmitted by the base station to the terminal through common RRC signaling or UE-specific RRC signaling (dedicated RRC signaling). As another example of such a configuration, values for $P_{0\_PUSCH}(j)$, $\alpha(j)$, $P_{S-PUCCH\_OFFSET}(k)$ may each be configured for a specific BP or BPG. For the remaining BPs or BPGs, only offset values (difference) may be configured based on the already configured values for $P_{0\_PUSCH}(j)$, $\alpha(j)$, $P_{S-PUCCH\_OFFSET}(k)$.

However, as RRC signaling is configured semi-statically, if the BP or BPG is dynamically changed, it may be difficult to reflect this in transmission power control. Hence, as described above, among values for $P_{0\_PUSCH}(j)$, $\alpha(j)$, $P_{S-PUCCH\_OFFSET}(k)$ for all BPs or BPGs, some values (subset) may be configured, and those values for $P_{0\_PUSCH}(j)$, $\alpha(j)$, $P_{S-PUCCH\_OFFSET}(k)$ to be actually used for controlling the S-PUCCH transmission power may be dynamically transmitted by the base station to the terminal through the group common PDCCH or the UE-specific PDCCH.

As another example, the hybrid beamforming system may manage downlink beams for transmission from the base station to the terminal and uplink beams for transmission from the terminal to the base station (beam management). The base station may indicate a beam (BP or BPG) for the PUSCH and the S-PUCCH to be transmitted by the terminal through MAC CE or DCI. Here, information on the beam or BP (or BPG) may be indirectly referred to through a resource index associated with the BP (or BPG) or an antenna port index associated with the BP (or BPG). More specifically, when the PUSCH is transmitted in a specific slot (e.g., $n^{th}$ slot), the base station may indicate information on the beam, BP or BPG to be used by the PUSCH transmitted in the $n^{th}$ slot through the DCI transmitted on the PDCCH in n–$k^{th}$ slot or the MAC CE transmitted on the physical downlink shared channel (PDSCH). Here, k can be configured through RRC signaling. For example, when the base station sets k to 0 (k=0), the terminal may obtain information on the beam, BP, or BPG to be used by the PUSCH transmission in the $n^{th}$ slot through the DCI transmitted on the PDCCH or the MAC CE transmitted on the PDSCH in $n^{th}$ slot. In this case, the information on the beam, BP or BPG may be a time/frequency resource index, an antenna port index, or a beam, BP or BPG index of a downlink RS (e.g., CSI-RS or SS) transmitted in the direction of a specific beam, BP or BPG.

To support the beam management of the base station, the terminal may store path-loss values for two or more beams, BPs, or BPGs. More specifically, as illustrated in Equation 8-1, Equation 8-2, Equation 8-3, Equation 8-4, and Equation 9, the terminal estimates PL to calculate the transmission power, and PL estimation may be based on referenceSignalPower transmitted by the base station and RSRP (reference signal received power) measured and filtered by the terminal as in Equation 2. In the hybrid beamforming system, as TX beamforming is applied to the RS transmitted by the base station, the base station can configure the terminal with referenceSignalPower reflecting its TX beam gain through RRC signaling. Also, in the hybrid beamforming system, as the beam may change dynamically, when performing higher layer filtering, it may be difficult to perform dynamic transmission power control according to the beam change due to a long delay time required for filtering. Hence, in the hybrid beamforming system, the path loss may be estimated using measured RSRP without higher layer filtering. Meanwhile, the base station may configure whether to apply higher layer filtering through RRC signaling (i.e., on or off of higher layer filtering). To configure higher layer filtering, the base station may transmit the terminal filtering coefficients to be used for higher layer filtering.

Meanwhile, for beam management, the terminal may periodically or aperiodically make a report to the base station about the beam, BP, or BPG indicated by the base station. For example, the base station may configure the number of beams, BPs, or BPGs to be reported by the terminal through RRC signaling or MAC CE. Based on this, the terminal may periodically or aperiodically report the quality of the corresponding beams, BPs or BPGs to the base station. More specifically, the base station may instruct the terminal to report about N beams, BPs or BPGs (N≥1). The terminal may measure and report RSRP (reference signal received power) of the N beams, BPs or BPGs. When the base station has configured the terminal with N=3, the terminal may report to the base station about three beams, BPs or BPGs with the strongest signal strength among all beams, BPs or BPGs in the cell (all beams, BPs or BPGs that can be formed by the base station and the terminal). Here, the terminal may report to the base station about the indexes of the three beams, BPs or BPGs with the strongest signal strength, and the signal strength (e.g., RSRP) of each beam, BP or BPG. The base station may indicate the beam, BP or BPG to be used at the n+$k^{th}$ subframe, among the N beams, BPs or BPGs reported by the terminal at the $n^{th}$ subframe, through DCI of the PDCCH or MAC CE of the PDSCH transmitted in the downlink at n+$1^{th}$ subframe. Here, l may be less than or equal to k. As described above, k and l may be configured by the base station to the terminal through RRC signaling.

The number of beams, BPs or BPGs for which PL is to be calculated by the terminal may be the same as the number of beams, BPs or BPGs configured by the base station for the beam management. Alternatively, the base station may separately configure the number of PL values to be calculated by the terminal for transmission power control. This configuration may be performed through common RRC signaling or UE-specific (dedicated) RRC signaling. Upon reception of an indication of the number of PL values to be calculated from the base station, the terminal may store the corresponding number of PL values for different beams, BPs or BPGs. The base station may indicate the PL value to be used among the PL values stored in the terminal through the DCI of the PDCCH or the MAC CE of the PDSCH in the downlink.

Meanwhile, when the PUSCH and the S-PUCCH are successively transmitted in the same slot, the PUSCH and the S-PUCCH may use different beams, BPs or BPGs. In this case, the base station may notify the terminal of information on the beam, BP or BPG to be used for the PUSCH and the S-PUCCH in the $n^{th}$ slot through the DCI of the PDCCH or the MAC CE of the PDSCH transmitted in the n–$k^{th}$ slot. As described above, k can be configured via RRC signaling. The base station may notify information on the beam, BP or BPG to be used for PUSCH transmission in the $n^{th}$ slot through the DCI of the PDCCH or the MAC CE of the PDSCH transmitted in the n–$k_1^{th}$ slot, and may notify information on the beam, BP or BPG to be used for S-PUCCH transmission in the $n^{th}$ slot through the DCI of the PDCCH or the MAC CE of the PDSCH transmitted in the n–$k_2^{th}$ slot. Here, $k_1$ and $k_2$ may have different values and may be configured through RRC signaling.

Figure 7A:
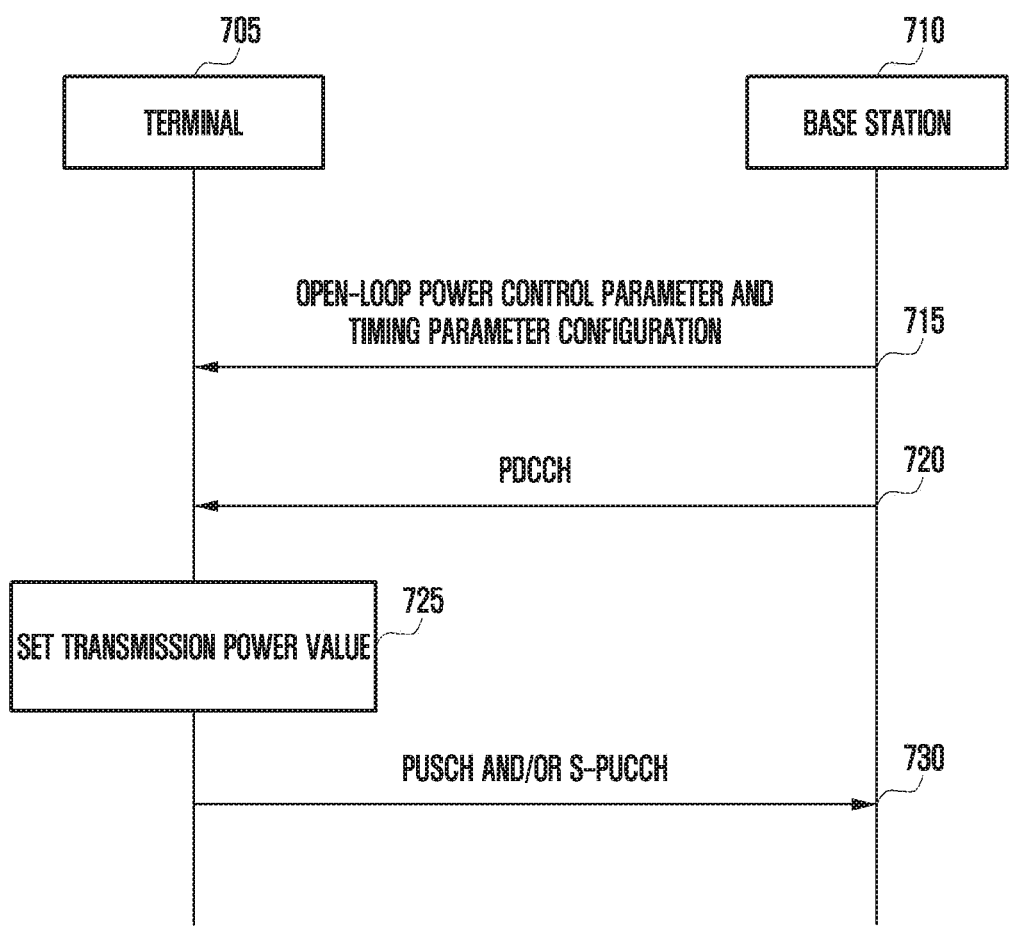
FIG. 7A illustrates a signaling procedure between the base station and the terminal for S-PUCCH transmission power in consideration of hybrid beamforming.

FIG. 7A illustrates a signaling procedure between the base station and the terminal for S-PUCCH transmission power in consideration of hybrid beamforming.

A description is given of a signal transmission and reception procedure between the terminal 705 and the base station 710 in relation to hybrid beamforming with reference to FIG. 7.

At step 715, the base station 710 may transmit open-loop power control information to the terminal 705. More specifically, the base station 710 may configure an open-loop power control parameter and timing parameter to the terminal 705 through RRC signaling. Here, the open-loop power control parameter may be at least one of $P_{S\text{-}PUCCH\_OFFSET}$ (k), $P_{0\_PUSCH}(j)$ or $\alpha(j)$ in Equation 8-1. It may be $P_{S\text{-}PUCCH\_OFFSET}(k)$ in Equation 8-2. It may be at least one of $P_{S\text{-}PUCCH\_OFFSET}$ or $h(n_{CQI}, n_{HARQ}, n_{SR})$ in Equation 8-3. It may be at least one of $P_{S\text{-}PUCCH\_OFFSET}$, $h(n_{CQI}, n_{HARQ}, n_{SR})$, $\Delta_{F\_PUCCH}(F)$, or $\Delta_{TxD}(F')$ in Equation 8-4. It may be at least one of $P_{S\text{-}PUCCH\_OFFSET}$ or $\Delta_{F\_PUCCH}(F)$ in Equation 9. The open-loop power control parameter may also include at least one of configuration information about the number of PL values stored by the terminal in relation to Equation 8-1, Equation 8-2, Equation 8-3, Equation 8-4, or Equation 9, or threshold information described in FIGS. 4A and 4B. These open-loop power control parameters may be different for different beams, BPs or BPGs, and may be transmitted by the base station to the terminal through UE-specific RRC signaling (dedicated RRC signaling). The use of different open-loop power control parameters for different beam pairs or beam pair groups may be represented by '1' in Equation 10 below.

$$P_{S\text{-}PUCCH}(i) = \min\{P_{CMAX}(i), P_{S\text{-}PUCCH\_OFFSET}(k,l) + 10 \log_{10}(M_{S\text{-}PUCCH}) + P_{0\_PUSCH} \cdot c(j,l) + \alpha(j,l) \cdot PL + f(i)\}$$
[dBm] Equation 10

Equation 10 is a variant of Equation 8-1, and '1' in $P_{S\text{-}PUCCH\_OFFSET}(k,l)$, $P_{0\_PUSCH}(j,l)$ and $\alpha(j,l)$ of Equation 10 indicates that different parameter values may be used for different beams, BPs or BPGs. Although $\alpha(j,l)$ in Equation 10 indicates that the base station can configure different values for different beams, BPs or BPGs, to fully compensate for the path loss for the maximum reliability of the control channel transmission, the value of $\alpha(j,l)$ may always be 1 without a separate configuration of the base station. Similarly, in Equation 8-2, Equation 8-3, Equation 8-4, and Equation 9, the open-loop power control parameters may have different values for different beams, BPs or BPGs and may include a value of '1'.

At step 720, the base station 710 may transmit the PDCCH to the terminal 705. At least one of the information elements described in the previous embodiment may be transmitted to the terminal 705 through the PDCCH.

At step 725, the terminal 705 may configure information for the uplink transmission power based on the previously received information.

At step 730, the terminal 705 may transmit at least one of the PUSCH or the S-PUCCH to the base station 710 in a specific slot based on the configured uplink transmission power information.

Figure 7B:
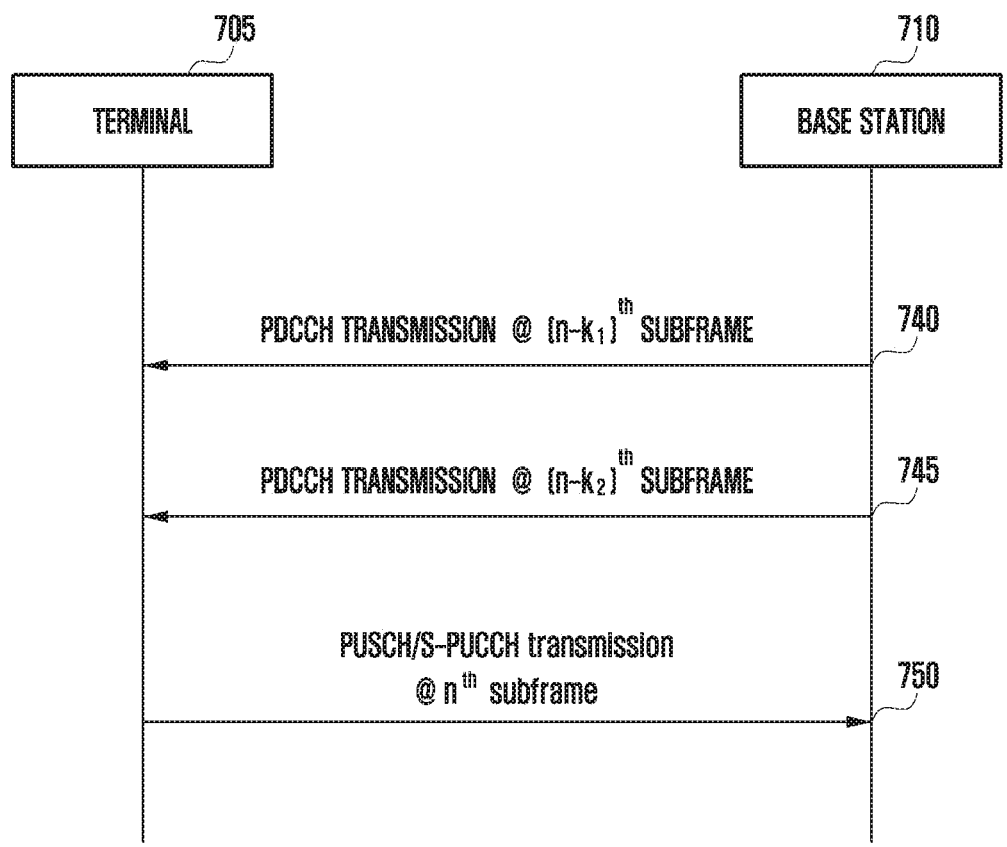
FIG. 7B illustrates timings of receiving a parameter through the PDCCH and applying the parameter to uplink transmission.

FIG. 7B illustrates timings of receiving a parameter through the PDCCH and applying the parameter to uplink transmission.

In FIG. 7, signal transmission and reception is started between the base station 710 and the terminal 705. More specifically, FIG. 7B illustrates timings of receiving information for the uplink transmission power control through the PDCCH and applying the information to uplink transmission.

In one embodiment, the base station may transmit the terminal information about a timing relationship between receiving information and applying the received information through control information. The base station may configure a timing parameter to the terminal through RRC signaling.

At step 740, the base station may transmit a specific command to the terminal at the $n-k_1^{th}$ subframe through the DCI of the PDCCH (or, MAC CE of the PDSCH), and this command may be applied when the terminal performs PUSCH transmission in the uplink at the $n^{th}$ subframe.

At step 745, the base station may transmit a specific command to the terminal at the $n-k_2^{th}$ subframe through the DCI of the PDCCH (or, MAC CE of the PDSCH), and this command may be applied when the terminal performs S-PUCCH transmission in the uplink at the $n^{th}$ subframe.

At step 750, the terminal may transmit at least one of the PUSCH or the S-PUCCH to the base station based on the configured information.

As described above, the base station may transmit $k_1$ and $k_2$ to the terminal through RRC signaling, and $k_1$ and $k_2$ may have the same or different values. According to an embodiment, $k_1$ and $k_2$ may be preset values. In an embodiment, when $k_1$ and $k_2$ are the same, the base station may configure one value. More specifically, the base station may notify the terminal of the parameter to be actually applied to the transmission power control of the PUSCH transmitted at the $n^{th}$ subframe, among the open-loop power control parameters configured by the base station, through the DCI of the PDCCH (or MAC CE of the PDSCH) at the $n-k_1^{th}$ subframe. The base station may also notify the terminal of the parameter to be actually applied to the transmission power control of the S-PUCCH transmitted at the $n^{th}$ subframe, among the open-loop power control parameters configured by the base station, through the DCI of the PDCCH (or MAC CE of the PDSCH) at the $n-k_2^{th}$ subframe. As another example, the base station may notify the terminal of the PL value to be actually applied to the transmission power control of the PUSCH transmitted at the $n^{th}$ subframe, among the PL values stored in the terminal, through the DCI of the PDCCH or the MAC CE of the PDSCH) at the $n-k_1^{th}$ subframe.

The base station may also notify the terminal of the PL value to be actually applied to the transmission power control of the S-PUCCH transmitted at the $n^{th}$ subframe, among the PL values stored in the terminal, through the DCI of the PDCCH or the MAC CE of the PDSCH) at the $n-k_2^{th}$ subframe. The base station may transmit $k_1$ and $k_2$ to the terminal through RRC signaling, and $k_1$ and $k_2$ may have the same or different values. In an embodiment, when $k_1$ and $k_2$ are the same, the base station may configure one value.

After configuring the open-loop power control parameters and the timing parameters, the base station can transmit the PDCCH to the terminal. Here, the DCI transmitted on the PDCCH (or MAC CE transmitted on the PDSCH) may include one or more of the following information items:

Among the open-loop transmission power control parameters configured by the base station through RRC signaling, the power control parameter to be actually used for PUSCH transmission and S-PUCCH transmission at the $n^{th}$ subframe (e.g., among $P_{S\text{-}PUCCH\_OFFSET}(k,l)$, $P_{0\_PUSCH}(j,l)$ and $\alpha(j,l)$ values configured for different beams, BPs or BPGs in Equation 9, $P_{S\text{-}PUCCH\_OFFSET}(k,l)$, $P_{0\_PUSCH}(j,l)$ and $\alpha(j,l)$ values to be used at the $n^{th}$ subframe). For example, assume that there are three beams, BPs or BPGs, and assume that open-loop power control parameters for them are configured through RRC signaling as follows. $P_{S\text{-}PUCCH\_OFFSET}(k,l) = \{x1, x2, x3\}$ [dBm], $P_{0\_PUSCH}(j,l) = \{y1, y2, y3\}$ [dBm], $\alpha(j,l) = \{z1, z2, z3\}$. If the parameters for the beam, BP or BPG to be used for the PUSCH at the $n^{th}$ subframe are x1, y2, and z3, respectively, the base station may indicate "000110" through the DCI transmitted on the PDCCH (or MAC CE transmitted on the PDSCH). Here, "00" of the 2 MSB bits may indicate x1, "01" of the 2 middle bits may indicate y2, and "10" of the 2 LSB bits may indicate z3. When such an indication is transmitted via the DCI, this DCI may be a group common DCI or a UE-specific DCI. As described above, the open-loop transmission power control parameters can be precisely indicated through the DCI of the PDCCH or MAC CE, but this may cause a lot of signaling overhead. Hence, the base station may directly indicate the beam, BP or BPG used for transmitting the PUSCH or the S-PUCCH at the $n^{th}$ subframe through the DCI transmitted on the PDCCH (or MAC CE transmitted on the PDSCH). For example, assume that there are three beams, BPs or BPGs, and assume that open-loop power control parameters for them are configured through RRC signaling as follows. $P_{S\text{-}PUCCH\_OFFSET}(k,l) = \{x1, x2, x3\}$ [dBm], $P_{0\_PUSCH}(j,l) = \{y1, y2, y3\}$ [dBm], $\alpha(j,l) = \{z1, z2, z3\}$. Then, if the index for the beam, BP or BPG to be used for the PUSCH at the $n^{th}$ subframe is 3, a value of 10 is transmitted through the DCI transmitted on the PDCCH (or MAC CE transmitted on the PDSCH). Here, "10" means an index of 3, and the terminal having received an index of 3 may use $P_{S\text{-}PUCCH\_OFFSET}(k,l) = x3$ [dBm], $P_{0\_PUSCH}(j,l) = y3$

[dBm], α(j,l)=z3. It is assumed that the terminal knows open-loop transmission power control parameter values mapped to each beam, BP or BPG. The terminal may calculate the transmission power values for the PUSCH and the S-PUCCH by using transmission power control parameters corresponding to (mapped to) the beam, BP or BPG indicated by the DCI or MAC CE.

Information indicating the PL value to be used among the two or more PL values stored in the terminal. The PL values may be mapped to the beams, BPs or BPGs. Hence, when the DCI transmitted on the PDCCH indicates use of a specific beam, BP or BPG for PUSCH transmission and S-PUCCH transmission at the $n^{th}$ subframe, the terminal may apply the PL value mapped to the indicated beam, BP or BPG to the transmission power control of the PUSCH and the S-PUCCH. Meanwhile, "PL" in Equation 8-1, Equation 8-2, Equation 8-3, Equation 8-4, Equation 9 or Equation 10 is a value estimated by the terminal through measurement of a downlink RS. In the hybrid beamforming system, as the downlink beam gain (TX beam gain of base station+ RX beam gain of terminal) and the uplink beam gain (TX beam gain of terminal+RX beam gain of base station) are different, the difference between the downlink PL value estimated by the terminal and the uplink PL value estimated by the base station may be large. In this case, the base station may instruct the terminal to perform transmission power control by applying the uplink PL value estimated by the base station. This uplink PL value may be transmitted by the base station to the terminal through RRC signaling, UE-specific DCI, or MAC CE. Upon receiving the uplink PL value, the terminal may use the uplink PL value transmitted by the base station to set the uplink transmission power without using the downlink PL value measured by the terminal. As another example, the base station may estimate the downlink PL value estimated by the terminal based on a power headroom report (PHR) transmitted by the terminal. The base station may estimate the uplink PL value by using an uplink RS or a sounding reference signal (SRS) transmitted by the terminal. The base station may obtain an offset value between two PL values by using the downlink PL value and the uplink PL value estimated by the base station. Then, the base station may transmit the PL offset value to the terminal through RRC signaling, UE-specific DCI, or MAC CE. Upon receiving the PL offset value, the terminal may correct the PL value to set the uplink transmission power by adding the offset value received from the base station to the downlink PL estimated by the terminal.

Meanwhile, the DCI transmitted on the PDCCH may include closed-loop transmission power control parameters $\delta_{PUSCH}$ and $\delta_{PUCCH}$. $\delta_{PUSCH}$ and $\delta_{PUCCH}$ may have the same or different values. If the two values are the same, one value may be indicated through the PDCCH. In addition, The DCI transmitted on the PDCCH may include $K_{PUSCH}$ and $K_{S-PUCCH}$ values. Here, $K_{PUSCH}$ and $K_{S-PUCCH}$ represent timings to which closed-loop parameters are applied, respectively. More specifically, if the DCI of the PDCCH received in the $n^{th}$ subframe indicates $K_{S-PUCCH}=4$, the terminal may apply the closed-loop transmission power parameter at the $n+4^{th}$ subframe. Such timing related parameters may be configured through RRC signaling. As another example, a set of timing related parameters (two or more parameters) may be configured by the base station through RRC signaling. Among these two or more parameters, the parameter to be actually used may be notified to the terminal through the group common DCI or UE-specific DCI.

Similarly, the base station may indicate a set of timing parameters $k_1$ and $k_2$ described in FIG. 7A to the terminal through RRC signaling, group common DCI or UE-specific DCI. When $k_1$ and $k_2$ have the same value, the base station may indicate one value.

As another example of transmission power control in hybrid beamforming, instead of using different open-loop power control parameters for different beams, BPs or BPGs, transmission power control may be performed for each beam, BP or BPG using only closed-loop transmission power control. More specifically, in Equation 8-1, Equation 8-2, Equation 8-3, Equation 8-4, Equation 9 or Equation 10, $P_{O\_PUSCH}$, α and $P_{S-PUCCH\_OFFSET}$ may have the same values regardless of the beam, BP or BPG used for PUSCH transmission and S-PUCCH transmission. Under this assumption, when the beam, BP or BPG used for PUSCH transmission or S-PUCCH transmission is changed, the base station may perform transmission power control by reflecting this in closed-loop power control parameters $\delta_{PUSCH}$ and $\delta_{S-PUCCH}$. That is, different $\delta_{PUSCH}$ and $\delta_{S-PUCCH}$ values may be used according to the beam, BP or BPG used for the PUSCH and S-PUCCH, and the $\delta_{PUSCH}$ value used for PUSCH transmission and the $\delta_{S-PUCCH}$ value used for S-PUCCH transmission may be different from each other.

In a 5G system, a plurality of subcarrier spacings (SCSs) may be used to support various services. For example, the 15 kHz SCS may be used to support an enhanced mobile broadband (eMBB) service, and the 60 kHz SCS may be used to support an ultra-reliable low-latency communication (URLLC) service. As another example, both the 15 kHz SCS and the 30 kHz SCS may be used to support an eMBB service. For example, the S-PUCCH for URLLC should be received by the base station with lower latency and higher reliability compared with the S-PUCCH for eMBB. In addition, even in the same eMBB service, specific traffic needs to have a shorter latency time than other traffic. Therefore, it is necessary to control the transmission power of the S-PUCCH in consideration of these characteristics, which is represented by Equation 11 below.

$$P_{S\text{-}PUCCH}(i) = \min\{P_{CMAX}(i), P_{S\text{-}PUCCH\_OFFSET}(k,n) + 10\log_{10}(M_{S\text{-}PUCCH}) + P_{0\_PUSCH}(j) + \alpha(j) \cdot PL + f(i)\} \text{ [dBm]} \quad \text{Equation 11}$$

In Equation 11, 'n' of $P_{S-PUCCH\_OFFSET}(k,n)$ is an index indicating numerology (subcarrier spacing (SCS)). For example, n=1 means an SCS of 15 kHz, and n=2 means an SCS of 30 kHz. $P_{S-PUCCH\_OFFSET}(k,n)$ may have different values depending on the value of n for a fixed value of k. $P_{S-PUCCH\_OFFSET}(k,n)$ values may be configured by the base station through common RRC signaling or UE-specific RRC signaling (dedicated RRC signaling), or may be indicated through the group common PDCCH or UE-specific DCI. $P_{S-PUCCH\_OFFSET(k,l)}$ in Equation 10 and $P_{S-PUCCH\_OFFSET(k,n)}$ in Equation 11 may have different values.

In the 5G system, both CP-OFDM (cyclic prefix orthogonal frequency division multiplexing) and DFT-S-OFDM (discrete Fourier transform-spread-OFDM) can be used for the uplink. The base station may configure whether the terminal uses CP-OFDM or DFT-S-OFDM for uplink transmission. Such configuration may be performed through common RRC signaling or UE-specific RRC signaling (dedicated RRC signaling), or may be indicated by the base station through the group common PDCCH or UE-specific DCI. Different transmission power values may be used for the S-PUCCH transmitted using CP-OFDM and the S-PUCCH transmitted using DFT-S-OFDM. For example, DFT-S-OFDM may have lower PAPR performance than CP-OFDM. For this reason, CP-OFDM requires more power backoff relative to DFT-S-OFDM. Hence, Equation 12 or Equation 13 below may be considered.

$$P_{S\text{-}PUCCH}(i) = \min\{P_{CMAX}(i) - \Delta, P_{S\text{-}PUCCH\_OFFSET}(k) + 10\log_{10}(M_{S\text{-}PUCCH}) + P_{0\_PUSCH}(j) + \alpha(j)\cdot PL + f(i)\} \text{ [dBm]} \quad \text{Equation 12}$$

In Equation 12, $\Delta$ is a value representing backoff for CP-OFDM and may be 0 for DFT-S-OFDM. When using CP-OFDM, the value obtained by backing off by $\Delta$ from $P_{CMAX}(i)$ may be the maximum transmission power that can be used by the terminal. $\Delta$ may have a fixed value (e.g., 2 dB), and whether $\Delta$ is zero or non-zero may depend on whether DFT-S-OFDM or CP-OFDM is used. If the uplink waveform is to be semi-statically changed, the base station may instruct the terminal to use CP-OFDM or DFT-S-OFDM through RRC signaling. When the use of CP-OFDM is indicated, the terminal may calculate the transmission power by applying a $\Delta$ value in Equation 12. If the uplink waveform needs to be dynamically changed, the base station may indicate the waveform through the group common DCI or UE specific DCI. For example, a specific bit in the DCI field may indicate the waveform to the terminal, and '0' may indicate the use of CP-OFDM and '1' may indicate the use of DFT-S-OFDM. The corresponding DCI may be transmitted in the downlink at the $n^{th}$ subframe, and the indicated waveform may be applied at the n+$k^{th}$ subframe. The k value may be configured by the base station through RRC signaling and may be greater than or equal to zero. If k=0, the terminal receiving the DCI at the $n^{th}$ subframe may use the waveform indicated by the DCI to transmit the S-PUCCH at the same subframe.

$$P_{S\text{-}PUCCH}(i) = \min\{P_{CMAX}(i), P_{S\text{-}PUCCH\_OFFSET}(k,w) + 10\log_{10}(M_{S\text{-}PUCCH}) + P_{0\_PUSCH,c}(j) + \alpha(j)\cdot PL + f(i)\} \text{[dBm]} \quad \text{Equation 13}$$

In Equation 13, not $P_{CMAX}(i)$ but $P_{S\text{-}PUCCH\_OFFSET}(k,w)$ changes according to the waveform. CP-OFDM and DFT-S-OFDM may be different in performance. Accordingly, the received SINR performance of the S-PUCCH may vary. Hence, the base station may configure different values for $P_{S\text{-}PUCCH\_OFFSET}(k,w)$ according to the waveform. Here, 'w' represents the index of the waveform. The values for $P_{S\text{-}PUCCH\_OFFSET}(k,w)$ may be configured by the base station through common RRC signaling or UE-specific RRC signaling (dedicated RRC signaling), or may be indicated by the base station through the group common PDCCH or UE-specific DCI.

As described above, the information required for uplink power control in consideration of each factor may be preset or transmitted by the base station to the terminal, and the terminal may perform uplink transmission based on such information.

Figure 8:
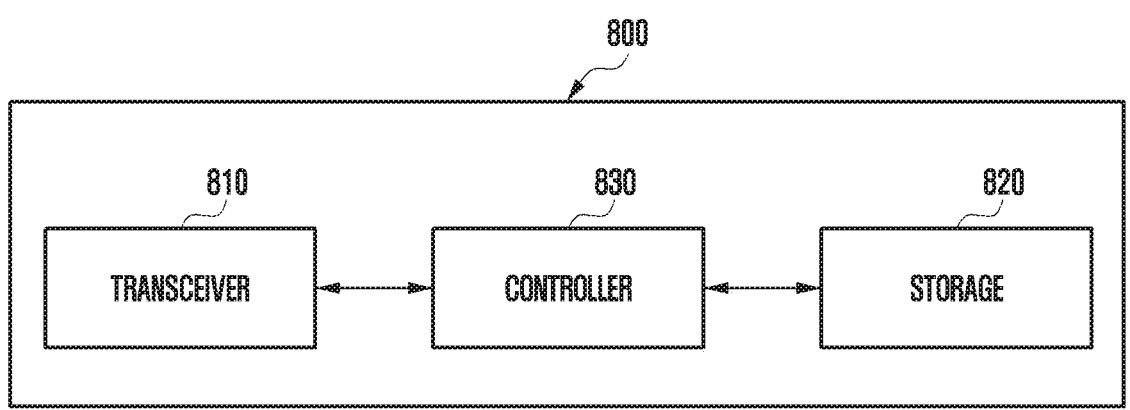
FIG. 8 is a block diagram of a terminal according to an embodiment of the disclosure.

FIG. 8 is a block diagram of a terminal according to the disclosure.

With reference to FIG. 8, in one embodiment, the terminal 800 may include a transceiver 810, a storage 820, and a controller 830.

The transceiver 810 may transmit and receive a signal to and from a base station.

The storage 820 may store at least one of information related to the terminal 800 or information transmitted and received through the transceiver 810. The storage 820 may store information related to the PL measured by the terminal.

The controller 830 may control the overall operation of the terminal 800, and may control the terminal 800 to perform operations related to the embodiments described above. The controller 830 may include at least one processor.

Figure 9:
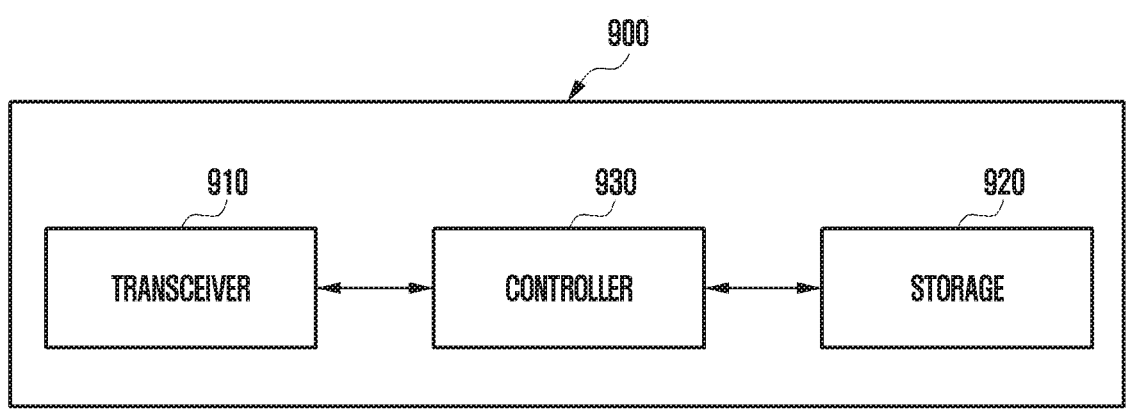
FIG. 9 is a block diagram of a base station according to an embodiment of the disclosure.

FIG. 9 is a block diagram of a base station according to the disclosure.

With reference to FIG. 9, in one embodiment, the base station 900 may include a transceiver 910, a storage 920, and a controller 930.

The transceiver 910 may transmit and receive a signal to and from a terminal or another network entity.

The storage 920 may store at least one of information related to the base station 900 or information transmitted and received through the transceiver 910.

The controller 930 may control the overall operation of the base station 900, and may control the base station 900 to perform operations related to the embodiments described above. The controller 930 may include at least one processor.

Hereinabove, embodiments of the disclosure have been described with reference to the accompanying drawings. Specific terms or words used in the description should be construed in accordance with the spirit of the disclosure without limiting the subject matter thereof. It should be understood that many variations and modifications of the basic inventive concept described herein will still fall within the spirit and scope of the disclosure as defined in the appended claims and their equivalents.

The invention claimed is:

1. A method for communication of a terminal in a mobile communication system, the method comprising:
   receiving, from a base station, a radio resource control (RRC) message including first information on a number of reference signal resources associated with a pathloss of a downlink signal transmitted from the base station;
   obtaining mapping information between the reference signal resources and values for indicating each of the reference signal resources;
   receiving, from the base station, downlink control information (DCI) including second information associated with one of the values for indicating each of the reference signal resources;
   determining a reference signal resource corresponding to the second information among the reference signal resources based on the mapping information;
   identifying the pathloss based on the determined reference signal resource; and
   transmitting, to the base station, an uplink signal based on the identified pathloss.

2. The method of claim 1, further comprising receiving, from the base station, third information including at least one of synchronization signal related information for identification of the pathloss or channel state information-reference signal (CSI-RS) related information for the identification of the pathloss.

3. The method of claim 1,
   wherein the pathloss is identified based on a reference signal received power (RSRP) associated with the determined reference signal resource.

4. The method of claim 3,
   wherein the RSRP is identified based on filtering information received through the RRC message from the base station.

5. A method for communication of a base station in a mobile communication system, the method comprising:
- transmitting, to a terminal, a radio resource control (RRC) message including first information on a number of reference signal resources for associated with a pathloss of a downlink signal transmitted from the base station;
- transmitting, to the terminal, downlink control information (DCI) including second information associated with one of values for indicating each of the reference signal resources; and
- receiving an uplink signal from the terminal with a transmission power based on the pathloss,
- wherein the pathloss is based on a reference signal resource corresponding to the second information among the reference signal resources, and
- wherein the reference signal resource corresponding to the second information among the reference signal resources is based on mapping information between the reference signal resources and the values for indicating each of the reference signal resources.

6. The method of claim 5, further comprising transmitting, to the terminal, third information including at least one of synchronization signal related information for identification of the pathloss or channel state information-reference signal (CSI-RS) related information for the identification of the pathloss.

7. The method of claim 5, wherein the pathloss is based on a reference signal received power (RSRP) associated with the reference signal resource corresponding to the second information and the RSRP is based on filtering information transmitted through the RRC message to the terminal.

8. A terminal in a mobile communication system, comprising:
- a transceiver; and
- a controller associated with the transceiver, and configured to:
  - receive, from a base station, a radio resource control (RRC) message including first information on a number of reference signal resources associated with a pathloss of a downlink signal transmitted from the base station,
  - obtain mapping information between the reference signal resources and values for indicating each of the reference signal resources,
  - receive, from the base station, downlink control information (DCI) including second information associated with one of the values for indicating each of the reference signal resources,
  - determine a reference signal resource corresponding to the second information among the reference signal resources based on the mapping information,
  - identify the pathloss based on the determined reference signal resource, and
  - transmit, to the base station, an uplink signal with the determined transmission power.

9. The terminal of claim 8, wherein the controller is configured to receive, from the base station, third information including at least one of synchronization signal related information for identification of the pathloss or channel state information-reference signal (CSI-RS) related information for the identification of the pathloss.

10. The terminal of claim 8,
- wherein the pathloss is identified based on a reference signal received power (RSRP) associated with the determined reference signal resource.

11. The terminal of claim 10,
- wherein the RSRP is identified based on filtering information received through the RRC message from the base station.

12. A base station in a mobile communication system, comprising:
- a transceiver; and
- a controller associated with the transceiver, and configured to:
  - transmit, to a terminal, a radio resource control (RRC) message including first information on a number of reference signal resources associated with a pathloss of a downlink signal transmitted from the base station,
  - transmit, to the terminal, downlink control information (DCI) including second information associated with one of values for indicating each of the reference signal resources, and
  - receive an uplink signal from the terminal with a transmission power based on the pathloss,
- wherein the pathloss is based on a reference signal resource corresponding to the second information among the reference signal resources, and
- wherein the reference signal resource corresponding to the second information among the reference signal resources is based on mapping information between the reference signal resources and the values for indicating each of the reference signal resources.

13. The base station of claim 12, wherein the controller is configured to transmit, to the terminal, third information including at least one of synchronization signal related information for identification of the pathloss or channel state information-reference signal (CSI-RS) related information for the identification of the pathloss.

14. The base station of claim 12,
- wherein the pathloss is based on a reference signal received power (RSRP) associated with the reference signal resource corresponding to the second information.

15. The base station of claim 14,
- wherein the RSRP is based on filtering information transmitted through the RRC message to the terminal.

* * * * *